US012459065B2

(12) United States Patent
Barton

(10) Patent No.: US 12,459,065 B2
(45) Date of Patent: Nov. 4, 2025

(54) MULTI-AXIS ALIGNMENT TOOL

(71) Applicant: Steven Franklin Barton, Holland, MI (US)

(72) Inventor: Steven Franklin Barton, Holland, MI (US)

( * ) Notice: Subject to any disclaimer, the term of this patent is extended or adjusted under 35 U.S.C. 154(b) by 0 days.

(21) Appl. No.: 15/689,207

(22) Filed: Aug. 29, 2017

(65) Prior Publication Data
US 2019/0061077 A1    Feb. 28, 2019

(51) Int. Cl.
| | | |
|---|---|---|
| *B23Q 3/06* | (2006.01) | |
| *B23H 11/00* | (2006.01) | |
| *B23Q 1/00* | (2006.01) | |
| *B23Q 3/18* | (2006.01) | |
| B23H 1/04 | (2006.01) | |
| F16B 19/00 | (2006.01) | |
| F16B 19/10 | (2006.01) | |

(52) U.S. Cl.
CPC ......... B23Q 3/061 (2013.01); B23H 11/003 (2013.01); B23Q 1/0081 (2013.01); B23Q 3/06 (2013.01); B23Q 3/186 (2013.01); B23H 1/04 (2013.01); F16B 19/002 (2013.01); F16B 19/1081 (2013.01)

(58) Field of Classification Search
CPC .. B23H 11/003; B23Q 1/0054; B23Q 1/0081; B23Q 1/009; B23Q 1/25; B23Q 1/26; B23Q 1/46; B23Q 1/48; B23Q 1/64; B23Q 3/02; B23Q 3/06; B23Q 3/18; B23Q 3/186; B25B 11/00; Y10T 279/13; B23B 31/026; B15J 15/02; B15J 15/0206; B25J 18/02; B25J 18/04

USPC ................................ 269/55, 266, 71, 188
See application file for complete search history.

(56) References Cited

U.S. PATENT DOCUMENTS

| | | | | |
|---|---|---|---|---|
| 2,432,058 A | * | 12/1947 | Wiken | ................. B24B 41/066 |
| | | | | 248/179.1 |
| 2,471,940 A | * | 5/1949 | Dion | .................... B23Q 1/4814 |
| | | | | 408/103 |
| 3,806,691 A | | 4/1974 | Roach | |
| 3,816,000 A | | 6/1974 | Fiedler | |
| 3,901,127 A | | 8/1975 | Stone | |
| 4,429,862 A | | 2/1984 | Niedecker | |
| 4,502,457 A | * | 3/1985 | Marron | ................ B23Q 1/5412 |
| | | | | 125/11.14 |
| 4,505,464 A | | 3/1985 | Chitayat | |
| 4,630,811 A | | 12/1986 | Rudisill | |
| 4,819,924 A | | 4/1989 | Yang | |
| 5,019,129 A | | 5/1991 | Johanson | |
| 5,224,716 A | * | 7/1993 | Saeda | ................. B23Q 1/5406 |
| | | | | 219/121.82 |

(Continued)

OTHER PUBLICATIONS

PCT Written Opinion of the International Searching Authority for International Application No. PCT/US18/48334 dated Nov. 2, 2018.

*Primary Examiner* — Lee D Wilson
*Assistant Examiner* — Aaron R McConnell
(74) *Attorney, Agent, or Firm* — King & Partners, PLC

(57) ABSTRACT

A multi-axis alignment tool including: a main body, a primary base, a puck, a first puck adjuster, a second puck adjuster, a puck retainer, a secondary base, a first pivot pin, a second pivot pin, a pivot block, a clamp head, an adjustment pin, a lock-down spacer, a first clamp finger, and a second clamp finger, wherein the multi-axis alignment tool is configured for to at least one of clamp, align, and position a work part in three axes.

1 Claim, 39 Drawing Sheets

(56) References Cited

U.S. PATENT DOCUMENTS

| | | | |
|---|---|---|---|
| 5,791,803 | A | 8/1998 | Nordquist |
| 6,103,987 | A | 8/2000 | Nordquist |
| 6,160,236 | A | 12/2000 | Nordquist |
| 6,252,192 | B1 | 6/2001 | Lozon et al. |
| 6,367,814 | B1 | 4/2002 | Luscher et al. |
| 6,427,995 | B1 | 8/2002 | Steinwall |
| 6,485,214 | B2 | 11/2002 | Schill |
| 6,609,851 | B2 | 8/2003 | Nordquist et al. |
| 6,930,272 | B1 | 8/2005 | Limano |
| 7,819,392 | B2 | 10/2010 | Kuroda et al. |
| 8,047,520 | B2 | 11/2011 | Kuroda |
| 9,149,875 | B2 | 10/2015 | Kramer |
| 2005/0265798 | A1 | 12/2005 | Boyl-Davis et al. |
| 2006/0242818 | A1 | 11/2006 | Penick et al. |
| 2007/0020065 | A1 | 1/2007 | Kirby |
| 2009/0152823 | A1 * | 6/2009 | Bernhardt ............... B23B 31/16 279/43 |
| 2015/0165609 | A1 | 6/2015 | Morris et al. |
| 2017/0153186 | A1 | 6/2017 | Jeanne et al. |

\* cited by examiner

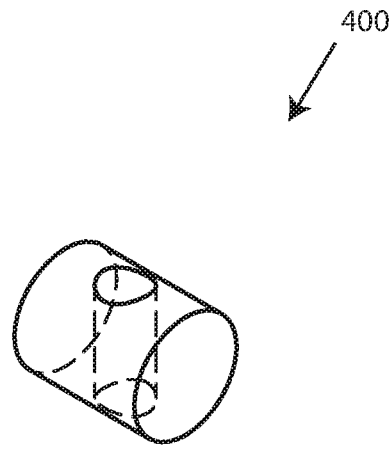
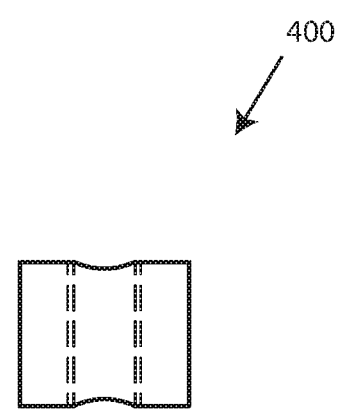
Figure 6A
Figure 6B
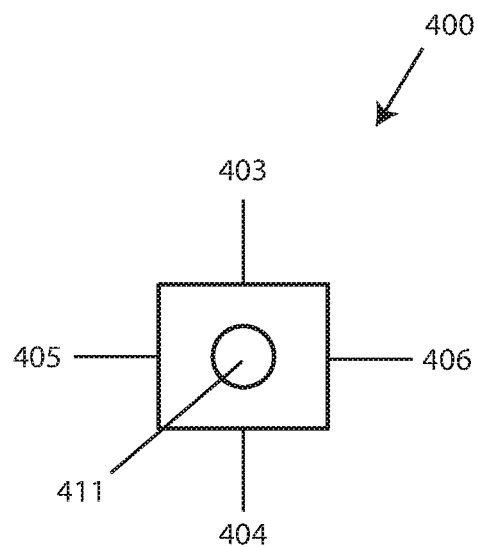
Figure 6C
Figure 6D

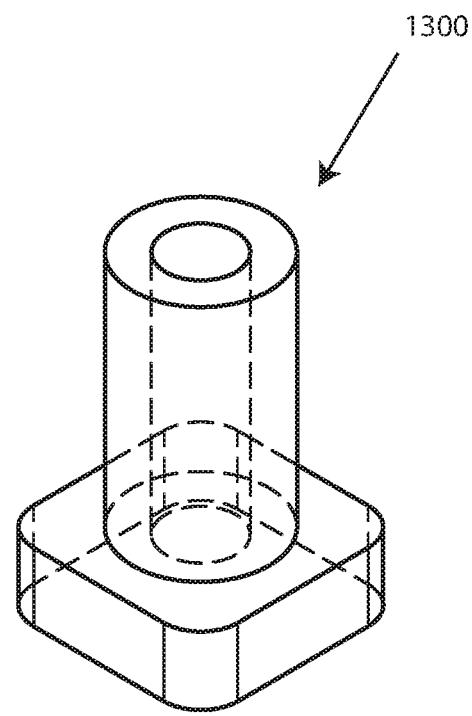
Figure 15A
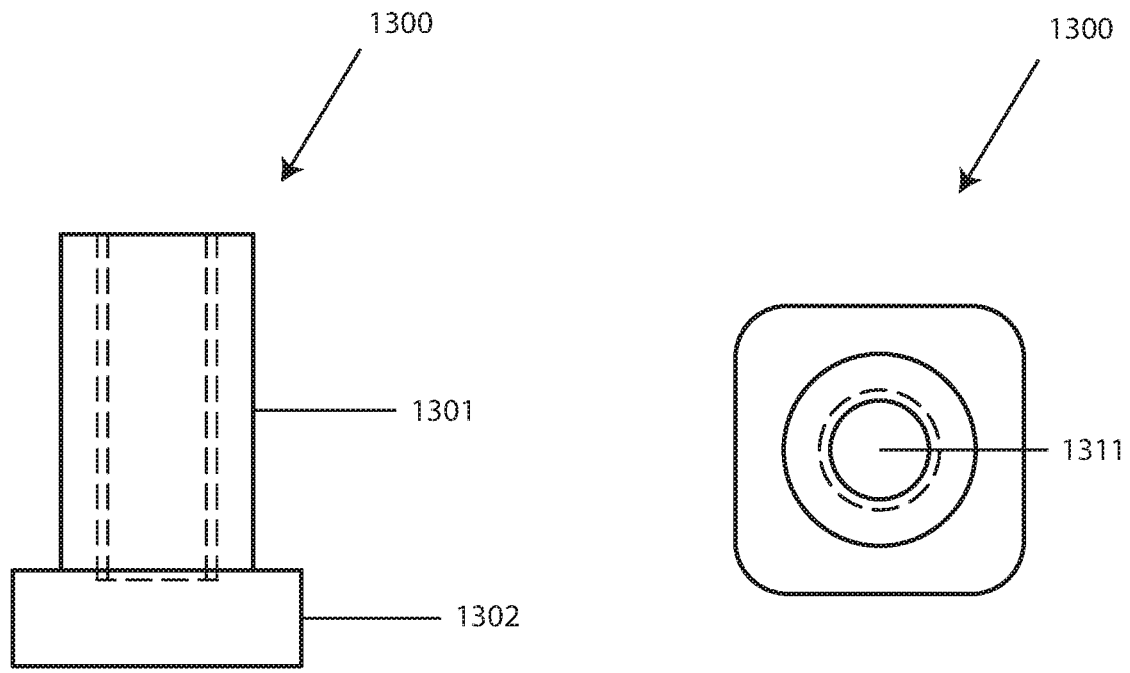
Figure 15B
Figure 15C

MULTI-AXIS ALIGNMENT TOOL

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to alignment tools and associated assemblies, and, more particularly, to novel multi-axis work holding and positioning tooling for electrical discharge machining (EDM) (e.g., spark machining, spark eroding, burning, die sinking, wire burning, wire erosion, etcetera) and other computer numerical control (CNC) equipment or manual machines. The alignment tools of the present invention enable a user to rapidly, accurately, and securely clamp, align, and position work part(s), in up to three axes, so that other operations can be efficiently performed on the part(s).

2. Background Art

Alignment, positioning, and clamping tools and associated assemblies have been known in the art for years and are the subject of a plurality of patents and publications, including: U.S. Pat. No. 9,149,875 entitled "Device for Clamping a Workpiece Holder to a Collet Chuck that can be Fixed to a Machine Tool," U.S. Pat. No. 8,047,520 entitled "Movable Article Coupling Apparatus," U.S. Pat. No. 6,930,272 entitled "Vise for Holding a Workpiece on an EDM Machine," U.S. Pat. No. 6,367,814 entitled "Apparatus for Clamping a Work Piece," U.S. Pat. No. 6,160,236 entitled "Clamping System," U.S. Pat. No. 6,103,987 entitled "Retaining Plate for a Machine Tool Work Piece," U.S. Pat. No. 5,791,803 entitled "Compressive Holding Device," U.S. Pat. No. 4,630,811 entitled "Modular Fixturing Apparatus," U.S. Pat. No. 3,816,000 entitled "Three Axes Alignment Means," and United States Patent Application Publication Number 2015/0165609 entitled "Self-Retaining Alignment System for Providing Precise Alignment and Retention of Components"—all of which are hereby incorporated herein by reference in their entirety including all references cited therein.

U.S. Pat. No. 9,149,875 appears to disclose a device for clamping a workpiece holder on a collect chuck that can be fixed to a machine tool, having clamping elements distributed around the circumference of the collet chuck. The clamping elements can be adjusted radially to the axis of the collect chuck from a release to a clamping position and can be pressed against a circumferential surface of the workpiece holder positioned relative to the collet chuck in the clamping position. The clamping elements are designed as rollers having axes aligned nearly tangentially to the collet chuck circumference. A determinable surface pressure thus results in the clamping position as the rollers mutually contact the workpiece holder, a clamping mandrel of the collet chuck, and the collet chuck part. The surface pressure is thereby reduced and the collet chuck can also be used in the range of greater tensile forces.

U.S. Pat. No. 8,047,520 appears to disclose a coupling apparatus for bringing a pallet (a movable article) near to a base side support from above, positioning it in the horizontal X, Y directions and in the vertical Z direction, and clamping it in a releasable manner comprises a pair of first engaging protrusions and a pair of second engaging protrusions formed on the top surface of the support for positing in the X direction and in the Y direction, respectively; a pair of first movable article side engaging protrusions each abutting the pair of first engaging protrusions on one side and a pair of second movable article side engaging protrusions each abutting the pair of second engaging protrusions on one side; a Z direction positioning mechanism for positioning the pallet relative to the support in the Z direction; and a clamping mechanism for clamping the pallet on the support.

U.S. Pat. No. 6,930,272 appears to disclose a vise for holding a work piece in position on an EDM machine that includes a main plate for attachment to the rail or ledge of the EDM machine, and the main plate supports a vise that holds the work piece in position during the machining process. The vise includes a movable jaw adjustable in the X direction and a solid jaw for clamping and holding the work piece therebetween. Both jaws include undercuts adjacent the work area of the vise, and the jaws define a clearance pocket so that the discharge wire can be moved to the work position adjacent the work piece. The solid jaw also provides a fixed and repeatable locating surface for the discharge wire so that the discharge wire can use the solid jaw to establish a reference point wherein the discharge wire touches off the solid jaw in order to move the discharge wire to the work position. The vise also includes an alignment and stopping device for maintaining the repeatability of location of the work piece in the vise in the Y direction as the work piece may be removed from the vise for checking and then returned a number of times during the machining process. The alignment and stopping device is mounted to the solid jaw and has an adjustment rod that extends between the jaw for providing an exact stopping point against which the work piece abuts.

U.S. Pat. No. 6,367,814 appears to disclose an apparatus for clamping a work piece in a well-defined position within the operating area of a machine tool that comprises a chuck member to be mounted within the operating area of the machine tool and a work piece carrier that can be put onto the chuck member and clamped thereto. First positioning members provided on the chuck member and second positioning members provided on the work piece carrier cooperate to define the position of the work piece carrier along three coordinate axes each running perpendicular to each other as well as with regard to the angular orientation. A clamping mechanism fixes the work piece carrier member to the chuck member in the aforementioned defined position. In order to ensure an increased resistance against tilting momenta and torque occurring during the machining of a work piece, the clamping mechanism comprises a plurality of clamping devices.

U.S. Pat. No. 6,160,236 appears to disclose a clamping system that includes a workpiece machining head having a coupling member, a mating coupling piece and a drawbolt, a pressure-medium actuated clamping device for the drawbolt being provided on the workpiece machining head, the coupling member having an axial reference axis (Z-axis) and reference parts, which are arranged at its end in a plane that is perpendicular to the reference axis and define a Z-reference for a first reference system, and the mating coupling piece having at its end face mating reference parts for the first reference system. In order to make the clamping system universally usable, provision is made for the coupling member to be surrounded by a coupling part, whose axis extends parallel to the reference axis and which has reference elements which define a Z'-reference and are assigned to a second reference system.

U.S. Pat. No. 6,103,987 appears to disclose a retaining plate for a machine tool work piece, where the machine tool is equipped with a tool, (e.g. an erosion wire), that can be moved in the Z-direction of a work area, and where the work area is bounded by an XY-plane that is perpendicular to the Z-axis, and with a work table whose work surface is in a specific position relative to the XY-plane and which is arranged in the direction of movement of the tool. In order to provide a holding mechanism that is particularly suitable for wire EDM-machines, and which allows for work piece transition any number of times without loss of alignment precision, a first plane section of the retaining plate with at least one opening for inserting the work piece, as well as retaining mechanisms for the work piece are provided, as well as elements on the second section of the retaining plate that are suitable to function together with mating elements on a chuck mounted on the work table for precise positioning of the first section within the work area.

U.S. Pat. No. 5,791,803 appears to disclose a compressive holding device having two coupling pieces and forcible elements for reversibly, axially, and compressively engaging the two coupling pieces in mutual engagement, wherein one of the coupling pieces has a plurality of aligning elements and the other coupling piece has a plurality of cooperating elements, such that when the compressive interengagement is carried out, the aligning elements and cooperating elements cooperate in mutual abutment to achieve accurate positioning of the coupling pieces in a circumferential direction. The aligning elements and/or the cooperating elements are subjected to a force in the circumferential direction, such that the cooperating elements and aligning elements are brought into forcible mutual abutment. The coupling pieces respectively have cooperating reference surfaces extending transversely to the direction of compressive interengagement, which reference surfaces facilitate accurate axial positioning.

U.S. Pat. No. 4,630,811 appears to disclose a modular fixturing apparatus for locating, orienting and holding a workpiece during a machining operation, having a workpiece specific mounting plate and a carrier apparatus provided with stop means and pusher means for accurately and reproducibly positioning the mounting plate on the carrier. The workpiece specific mounting plate has a workpiece specific pattern of threaded holes adapted to attach locating, clamping and supporting devices to hold the workpiece during the machining operation. Accurate, reproducible location and orientation of successive workpieces of the same geometry on the apparatus for the same machining operations is achieved quickly and positively. Reconstruction of the fixturing apparatus to hold subsequent workpieces of the same geometry in the same location and orientation is also readily achieved.

U.S. Pat. No. 3,816,000 appears to disclose an apparatus for accurately aligning equipment such as the electronic and optical direction sensing, direction indicating and direction finding equipment used on air and space vehicles and the like, the apparatus including a laser, beam splitter, and angle sensing detector means positioned to respond to the laser beam energy for producing electrical signal outputs for use in aligning equipment in mutually perpendicular planes representing roll, pitch and yaw, said detector means being able to detect angular deviations about any one or more of the three mutually perpendicular axes. Lateral displacement and angular deviations being relative to an established plane of the laser beams. The subject device has diverse uses including being used to align guidance components and systems, aiming, sighting, tracking and other electronic and optical devices, directional antenna devices and systems, shop tooling fixtures and other applications where precise alignment accuracy of one member with respect to another or with respect to an established frame of reference is required and with less man power being required.

United States Patent Application Publication Number 2015/0165609 appears to disclose an elastically averaging self-retaining alignment system that includes a first component and a second component. The first component includes a first alignment member and an elastically deformable alignment element fixedly disposed with respect to the first alignment member, the alignment element having a hollow tube. The second component includes a second alignment member and an alignment feature fixedly disposed with respect to the second alignment member, the alignment feature having an aperture with a plurality of inwardly extending tabs. The elastically deformable alignment element is configured and disposed to interferingly, deformably and matingly engage the alignment feature. Portions of the elastically deformable alignment element when inserted into the alignment feature elastically deform to an elastically averaged final configuration that aligns and retains the first component relative to the second component in at least two of four planar orthogonal directions.

While aligning, positioning, and clamping tools and associated assemblies, as disclosed hereinabove, have been known in the art for years, issues associated with rapidly, accurately, and securely aligning, positioning, and clamping work parts remains largely problematic. As such, there remains a genuine demand for novel alignment tools that enable a user to rapidly, accurately, and securely clamp, align, and position work part(s), in up to three axes, so that other operations can be performed on the part(s) in an efficient manner.

These and other objects of the present invention will become apparent in light of the present specification, claims, and drawings.

SUMMARY OF THE INVENTION

The present invention is directed to a multi-axis alignment tool, comprising, consisting essentially of, and/or consisting of: a main body; a primary base; a puck; a first puck adjuster; a second puck adjuster; a puck retainer; a secondary base; a first pivot pin; a pivot block; a clamp head; an adjustment pin; a lock-down spacer; and a second pivot pin, wherein the multi-axis alignment tool is configured to at least one of clamp, align, and position a work part in three axes.

In a preferred embodiment of the present invention, the primary base is positioned below and releasably secured to the main body.

In another preferred embodiment of the present invention, the puck is positioned within the main body and rotatably secured to the main body.

In yet another preferred embodiment of the present invention, the lock-down spacer is positioned within an aperture on a top surface of the main body.

In a preferred embodiment of the present invention, the adjustment pin is positioned at least partially within an aperture on a bottom surface of the main body and/or within an aperture of the primary base.

In another preferred embodiment of the present invention, the first and second puck adjusters are positioned within independent open slots of the puck.

In yet another preferred embodiment of the present invention, the puck retainer is positioned within a central aperture of the puck.

In a further embodiment of the present invention, the secondary base encloses the puck and is positioned adjacent to the primary base.

In another aspect of the present invention, the first pivot pin is positioned within the pivot block.

In a preferred embodiment of the present invention, a portion of the secondary base is positioned within the pivot block and the first pivot pin.

In another preferred embodiment of the present invention, the clamp head is positioned adjacent to and releasably secured to the pivot block.

In yet another preferred embodiment of the present invention, a first clamp finger and a second clamp finger are releasably received within independent slots of the clamp head.

The present invention is also directed to a multi-axis alignment tool, comprising, consisting essentially of, and/or consisting of: a main body; a primary base; a puck; a first puck adjuster; a second puck adjuster; a puck retainer; a secondary base; a first pivot pin; a second pivot pin; a pivot block; a clamp head; an adjustment pin; a lock-down spacer; a first clamp; and a second clamp finger; wherein the multi-axis alignment tool is configured to at least one of clamp, align, and position a work part in three axes; and wherein any remainder parts comprise washers, bolts and/or fasteners.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein:

FIG. 6A of the drawings is an isometric view of the puck adjuster of the multi-axis alignment tool manufactured in accordance with the present invention;

FIG. 6B of the drawings is a side view of the puck adjuster of the multi-axis alignment tool manufactured in accordance with the present invention;

FIG. 6C of the drawings is a top plan view of the puck adjuster of the multi-axis alignment tool manufactured in accordance with the present invention;

FIG. 6D of the drawings is a front end view of the puck adjuster of the multi-axis alignment tool manufactured in accordance with the present invention;

FIG. 15A of the drawings is an isometric view of the second pivot pin of the multi-axis alignment tool manufactured in accordance with the present invention;

FIG. 15B of the drawings is a side view of the second pivot pin of the multi-axis alignment tool manufactured in accordance with the present invention;

FIG. 15C of the drawings is a top plan view of the second pivot pin of the multi-axis alignment tool manufactured in accordance with the present invention.

DETAILED DESCRIPTION OF THE INVENTION

Figure 1A:
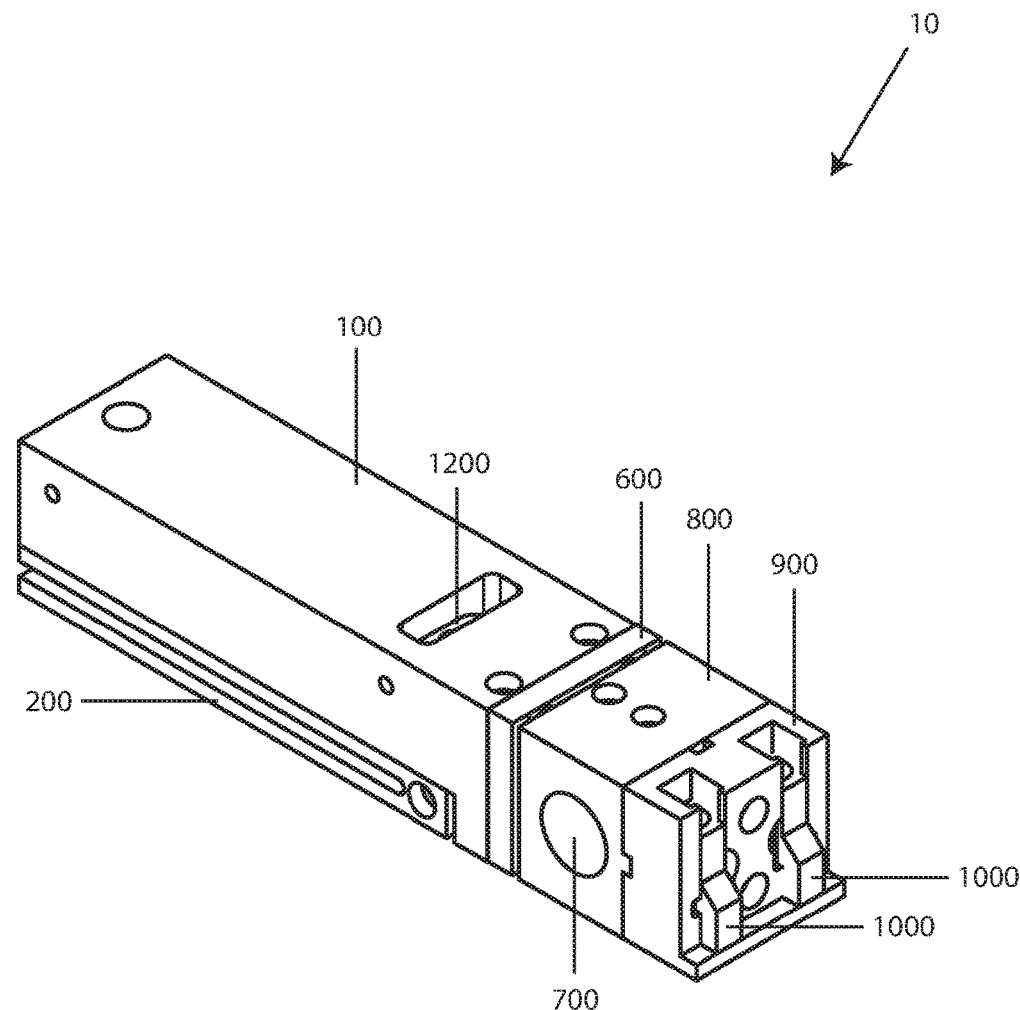
FIG. 1A of the drawings is an isometric view of a multi-axis alignment tool manufactured in accordance with the present invention.
Figure 1B:
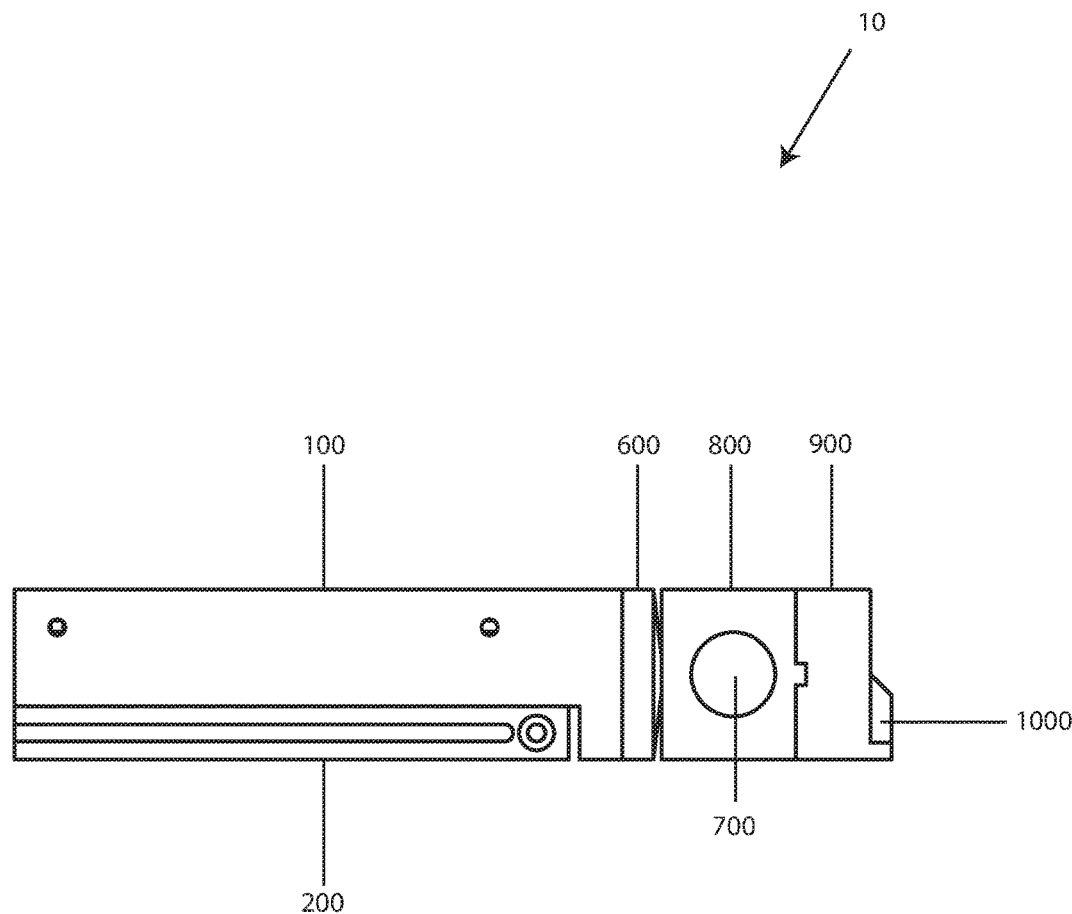
FIG. 1B of the drawings is a side view of the multi-axis alignment tool manufactured in accordance with the present invention.
Figure 1C:
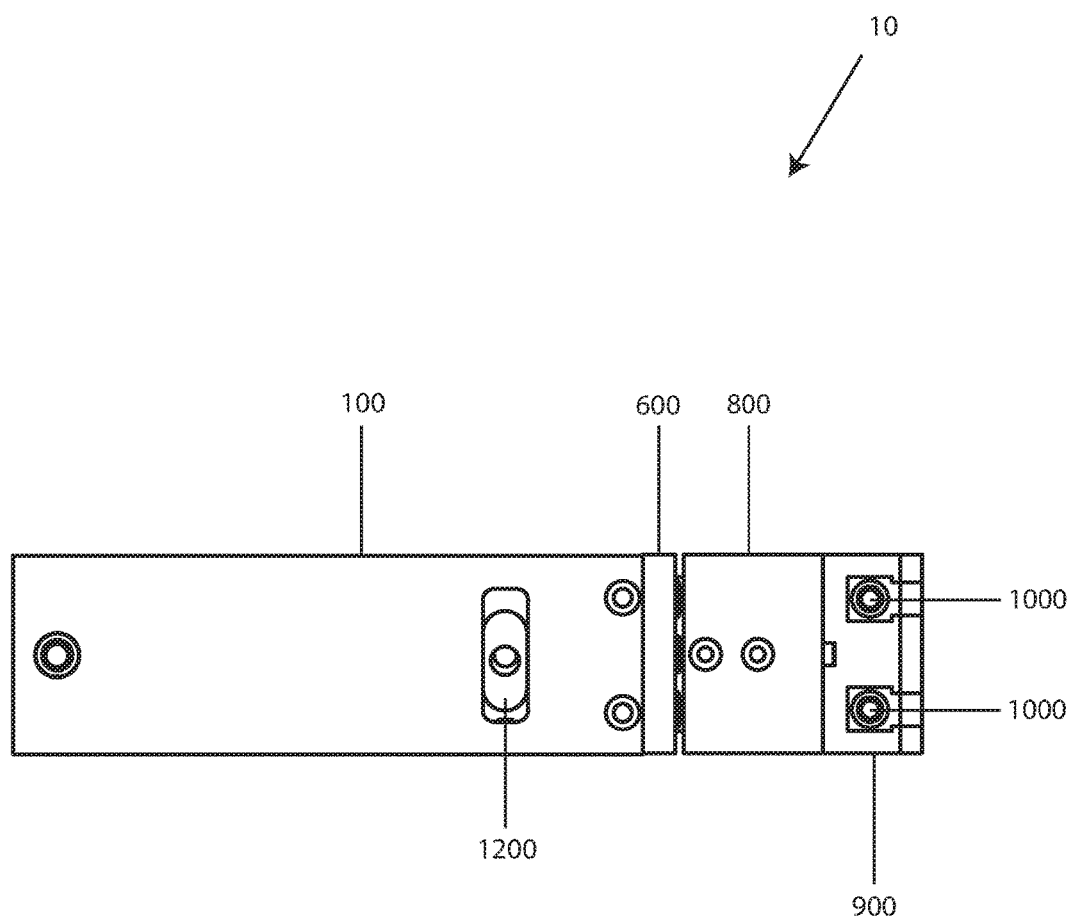
FIG. 1C of the drawings is a top plan view of the multi-axis alignment tool manufactured in accordance with the present invention.
Figure 1D:
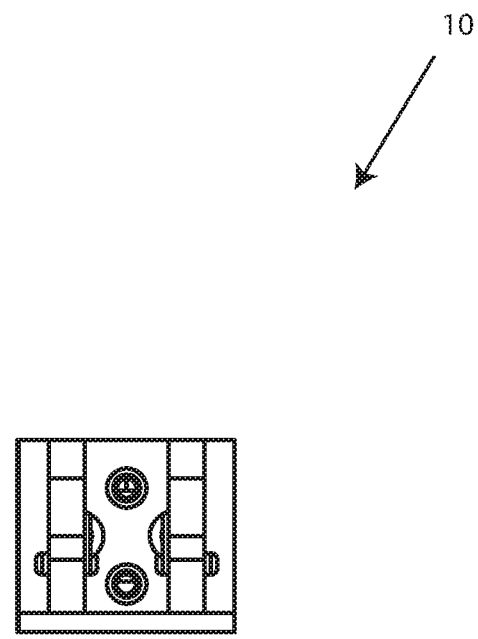
FIG. 1D of the drawings is a front end view of the multi-axis alignment tool manufactured in accordance with the present invention.
Figure 2A:
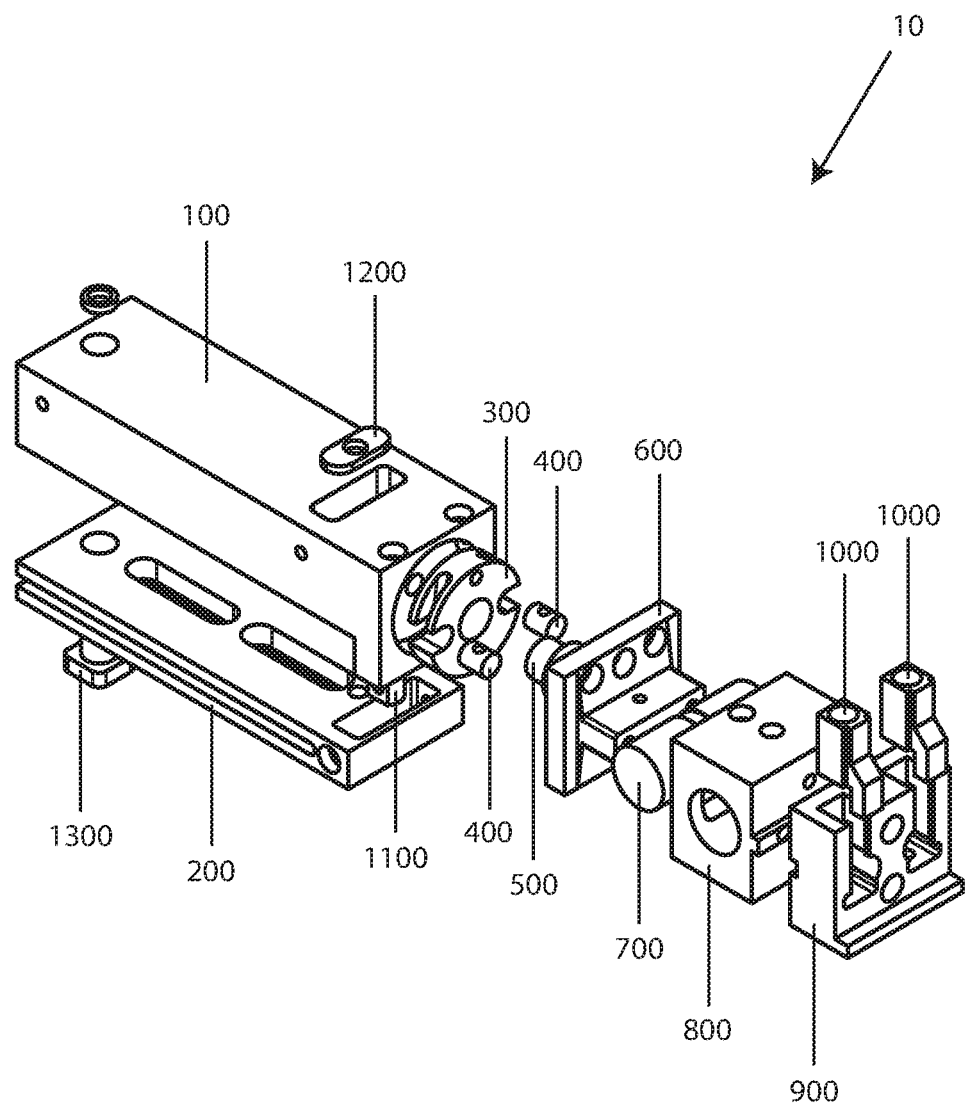
FIG. 2A of the drawings is an exploded isometric view of the multi-axis alignment tool manufactured in accordance with the present invention.
Figure 2B:
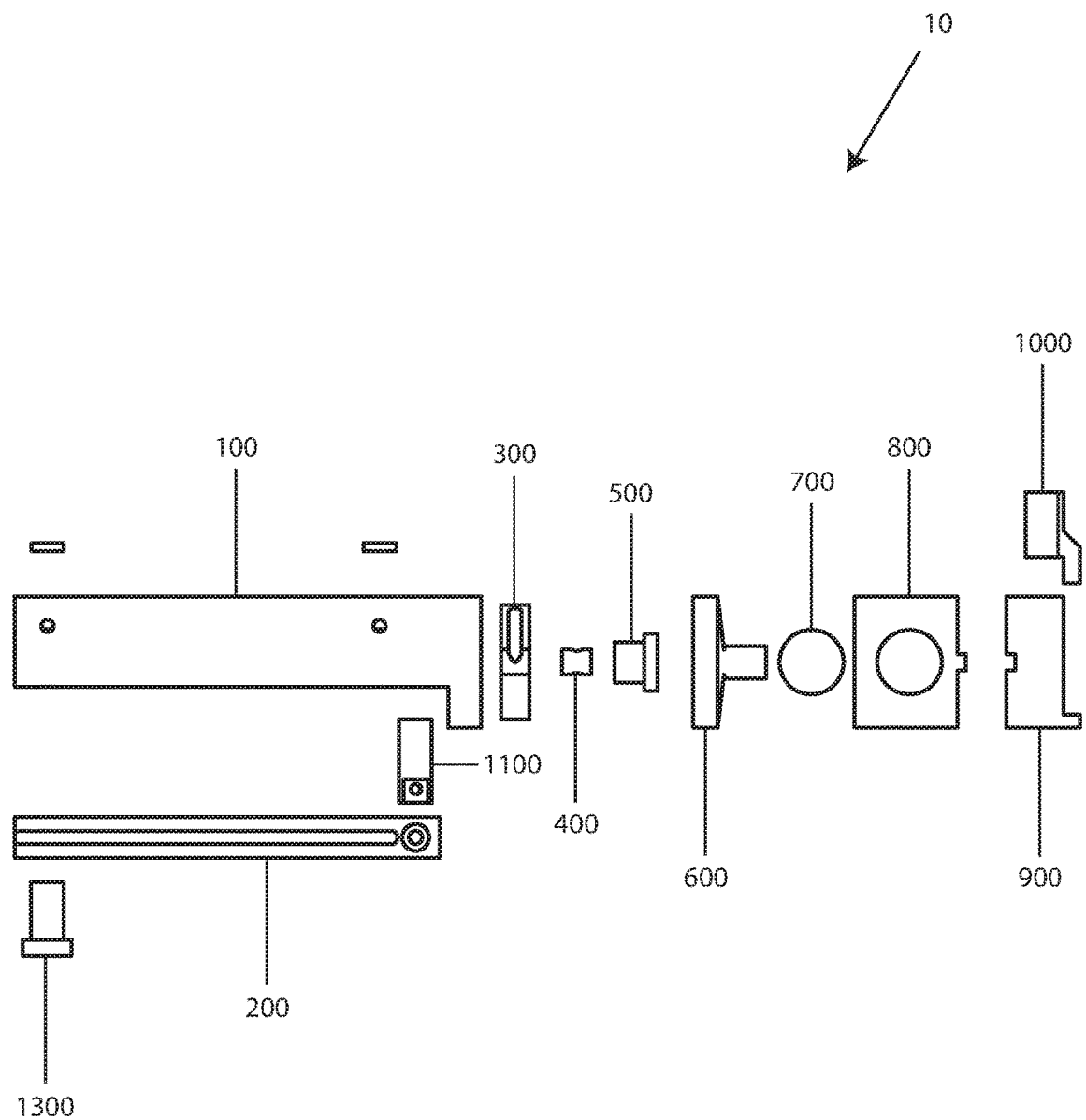
FIG. 2B of the drawings is an exploded side view of the multi-axis alignment tool manufactured in accordance with the present invention.
Figure 2C:
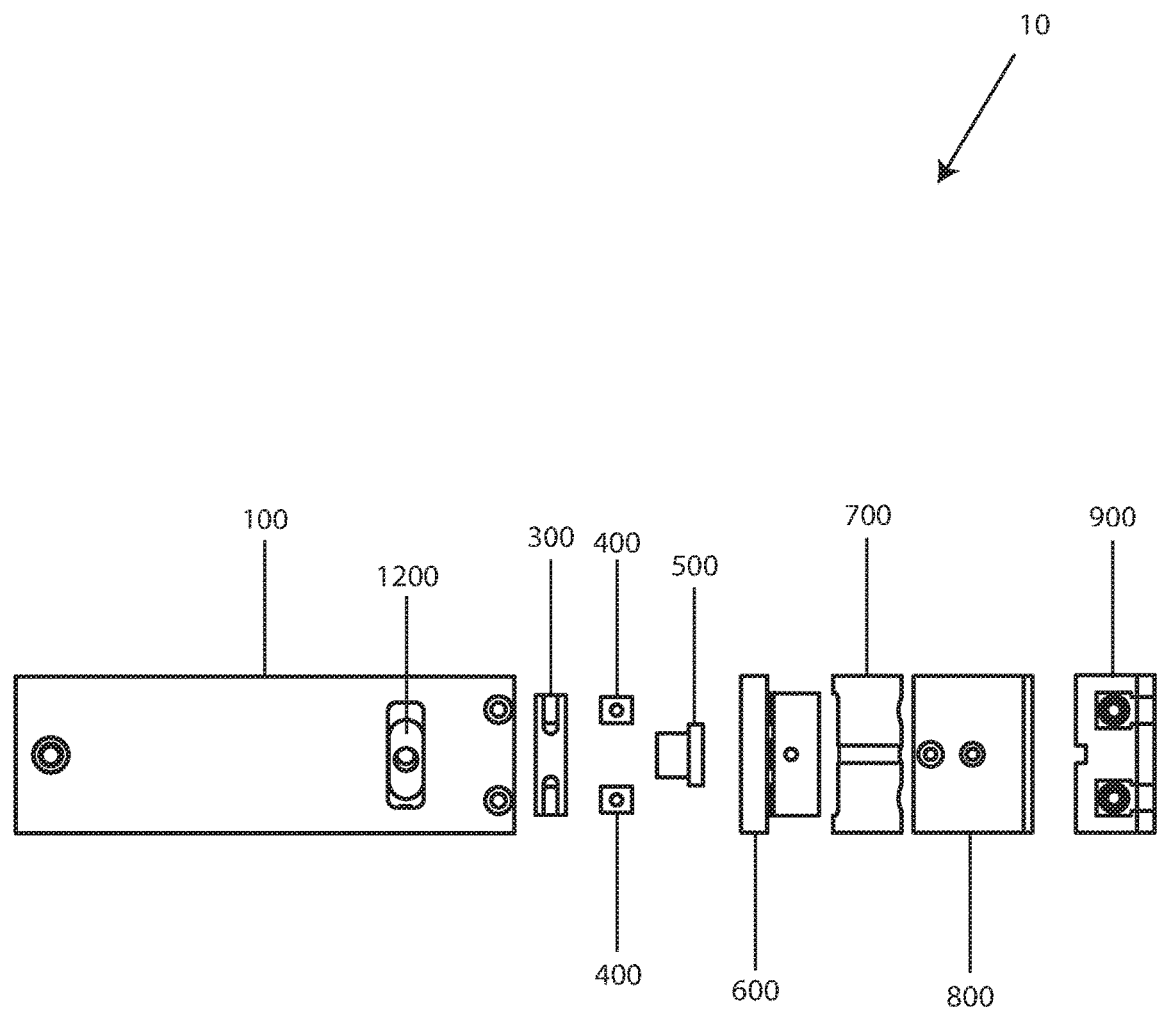
FIG. 2C of the drawings is an exploded top plan view of the multi-axis alignment tool manufactured in accordance with the present invention.
Figure 2D:
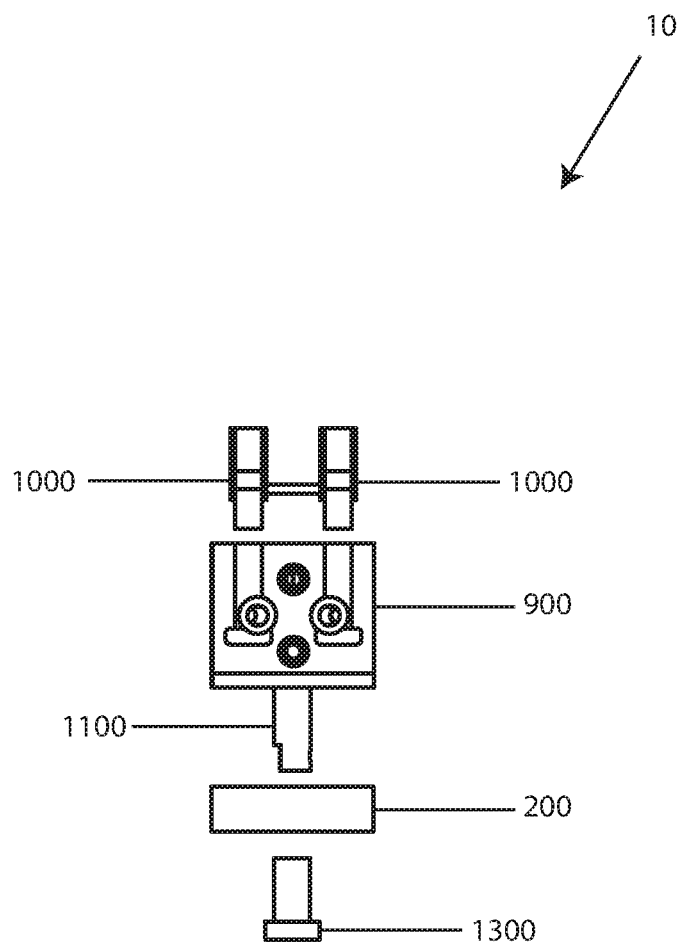
FIG. 2D of the drawings is an exploded front end view of the multi-axis alignment tool manufactured in accordance with the present invention.
Figure 3A:
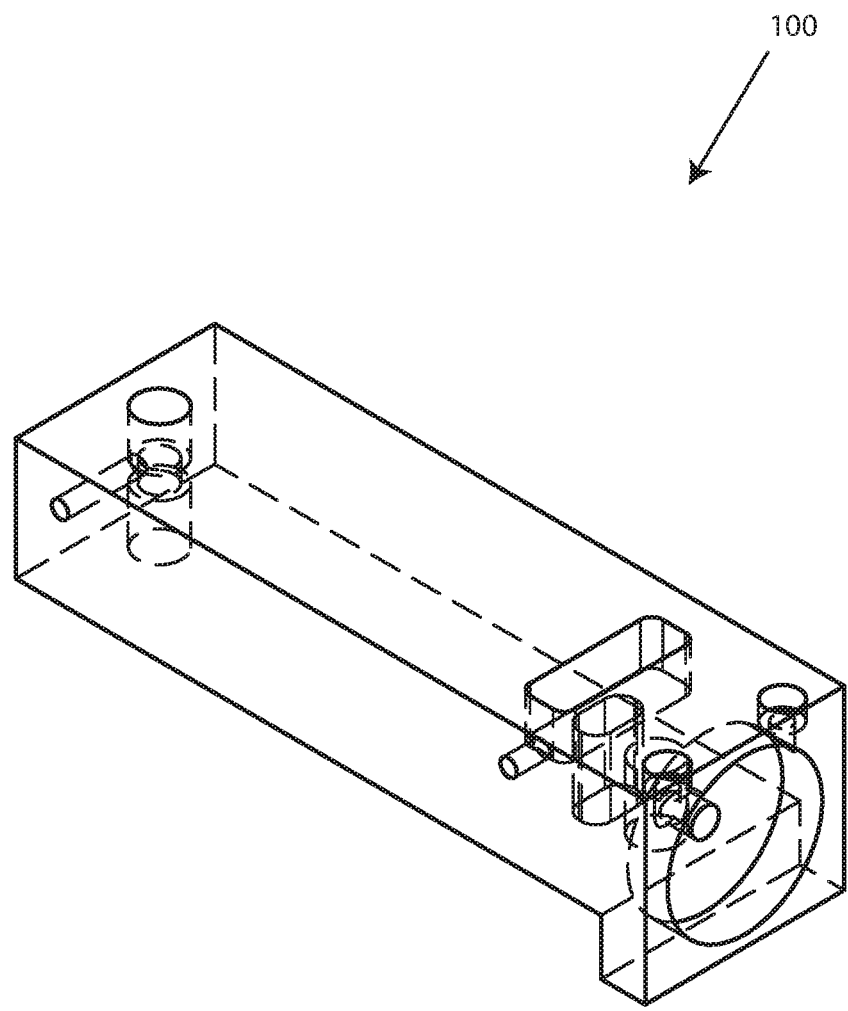
FIG. 3A of the drawings is an isometric view of the main body of the multi-axis alignment tool manufactured in accordance with the present invention.
Figure 3B:
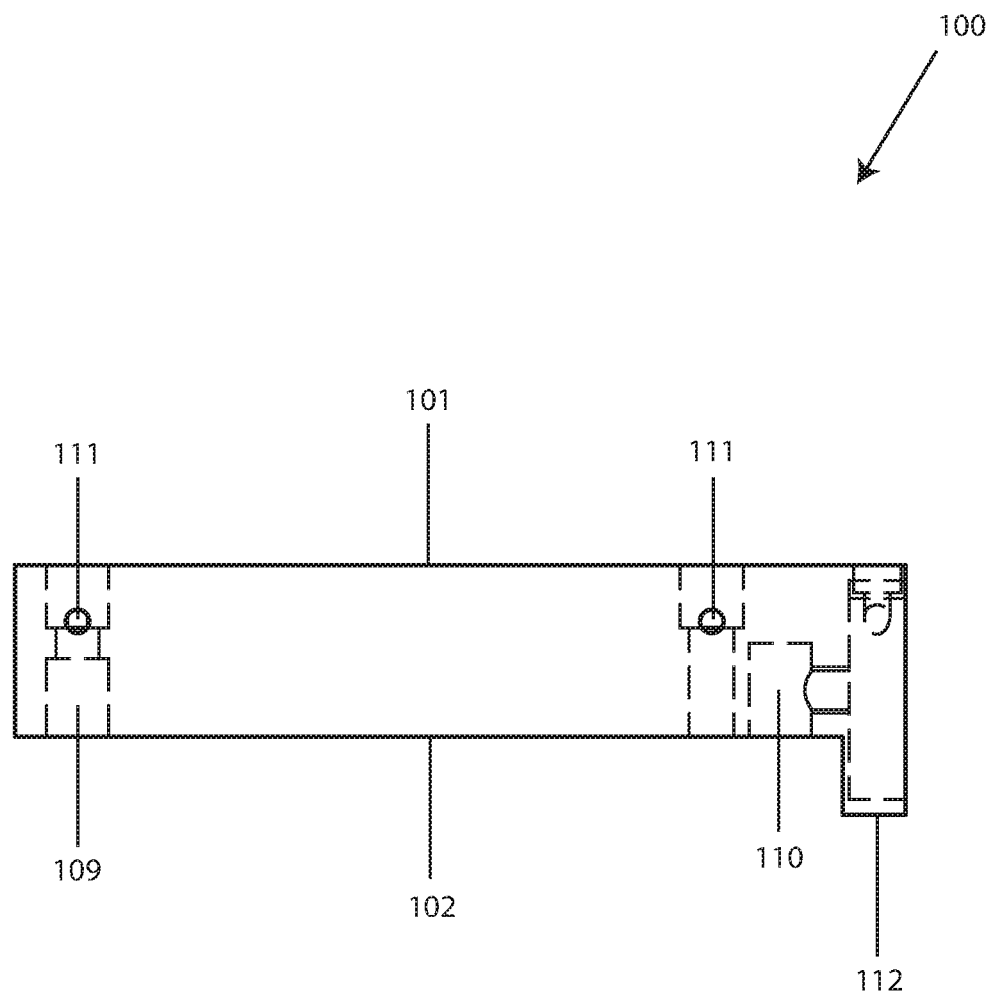
FIG. 3B of the drawings is a side view of the main body of the multi-axis alignment tool manufactured in accordance with the present invention.
Figure 3C:
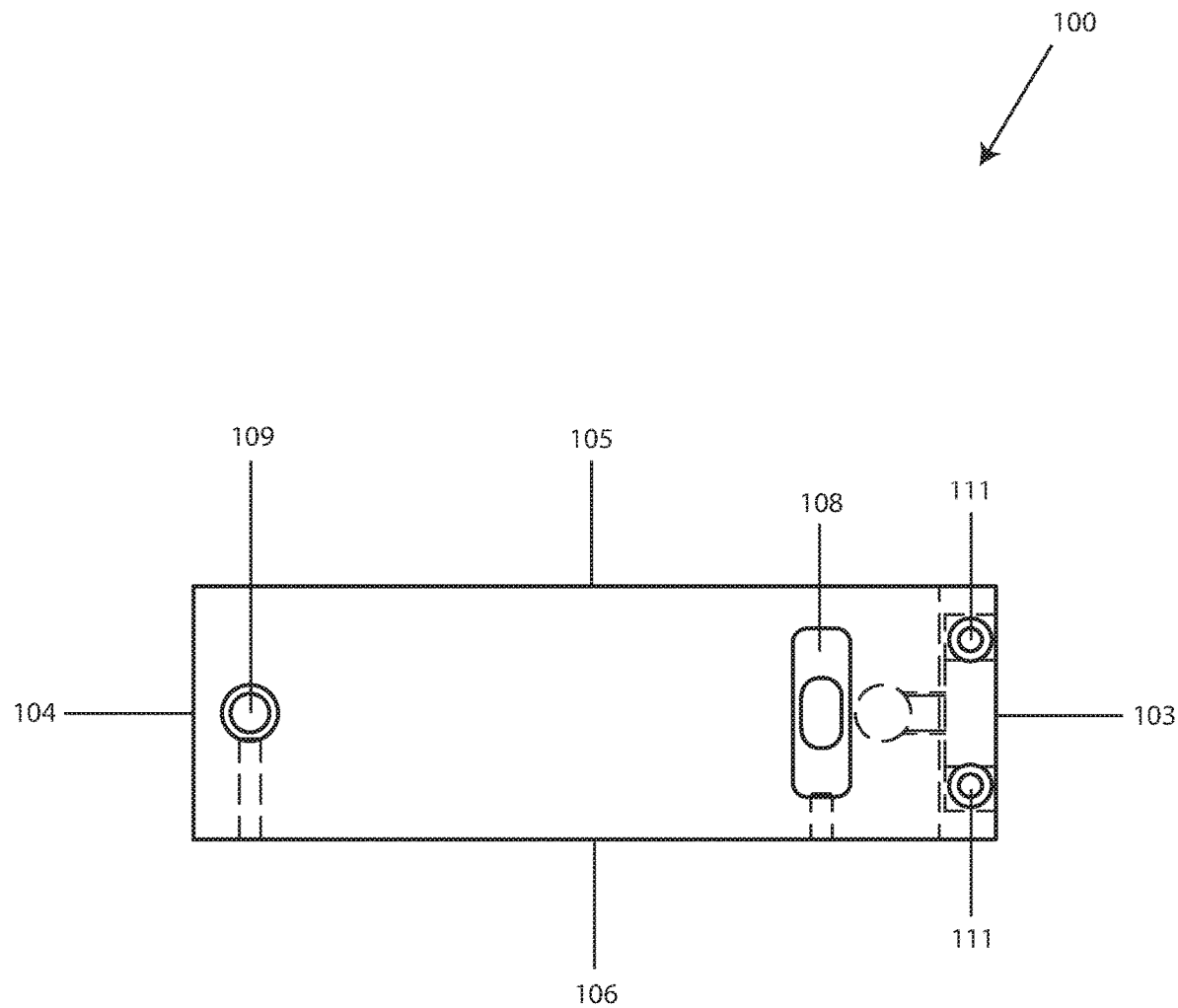
FIG. 3C of the drawings is a top plan view of the main body of the multi-axis alignment tool manufactured in accordance with the present invention.
Figure 3D:
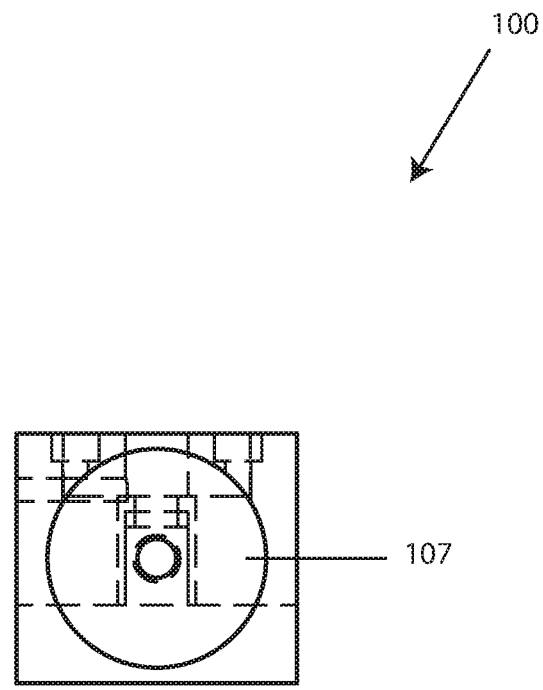
FIG. 3D of the drawings is a front end view of the main body of the multi-axis alignment tool manufactured in accordance with the present invention.
Figure 4A:
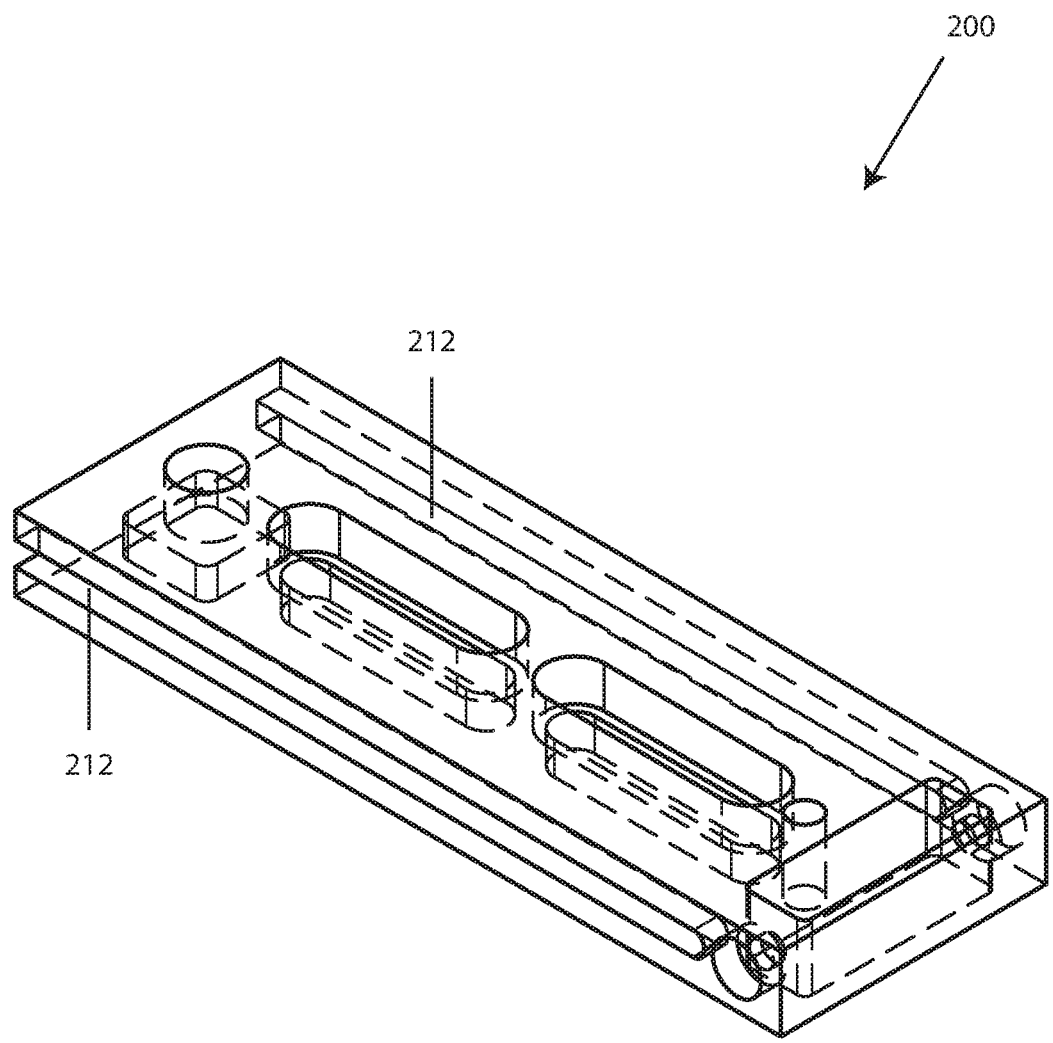
FIG. 4A of the drawings is an isometric view of the primary base of the multi-axis alignment tool manufactured in accordance with the present invention.
Figure 4B:
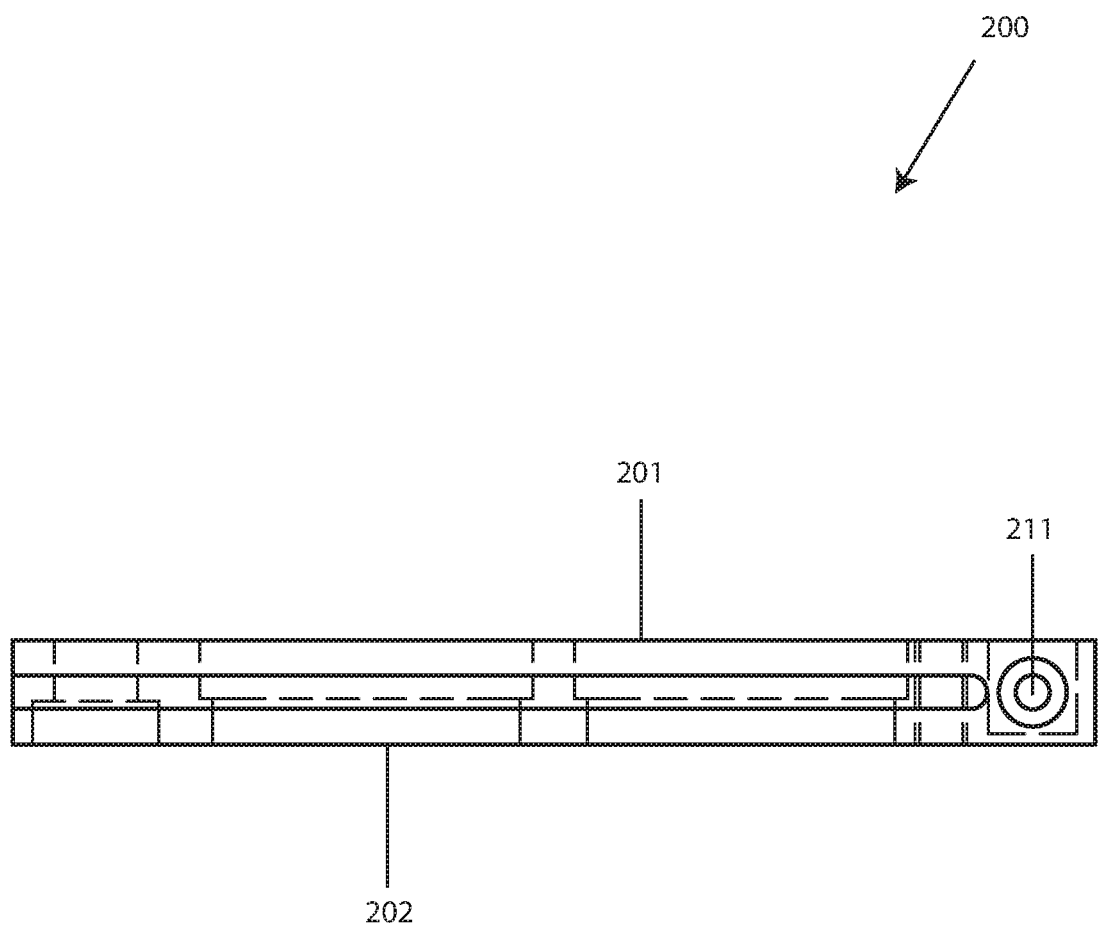
FIG. 4B of the drawings is a side view of the primary base of the multi-axis alignment tool manufactured in accordance with the present invention.
Figure 4C:
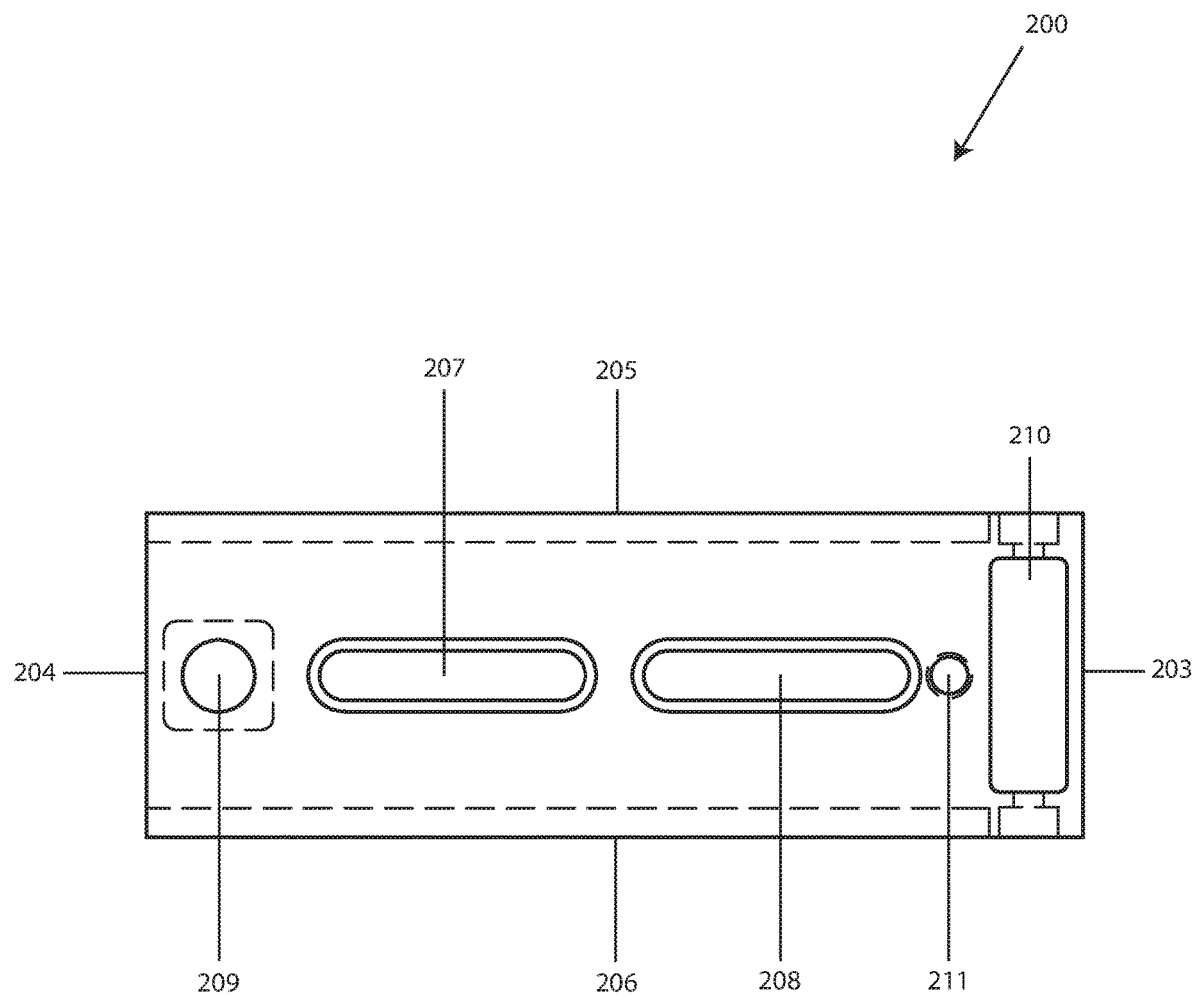
FIG. 4C of the drawings is a top plan view of the primary base of the multi-axis alignment tool manufactured in accordance with the present invention.
Figure 4D:
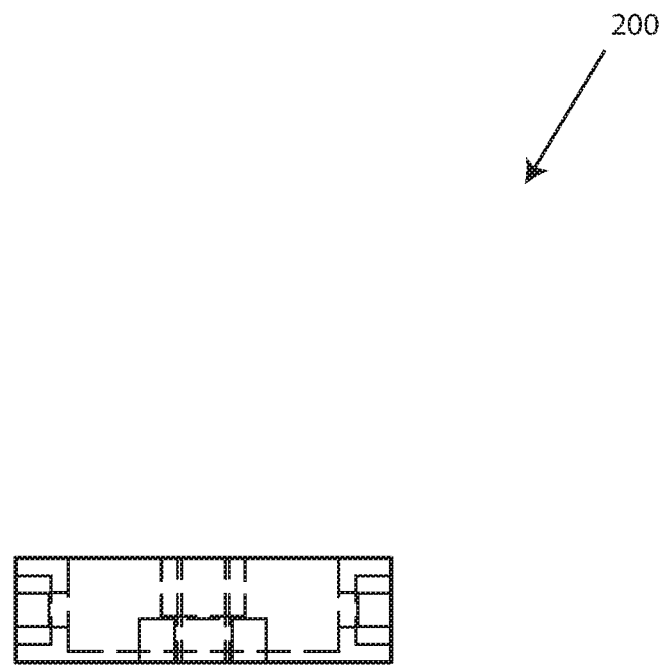
FIG. 4D of the drawings is a front end view of the primary base of the multi-axis alignment tool manufactured in accordance with the present invention.
Figure 5A:
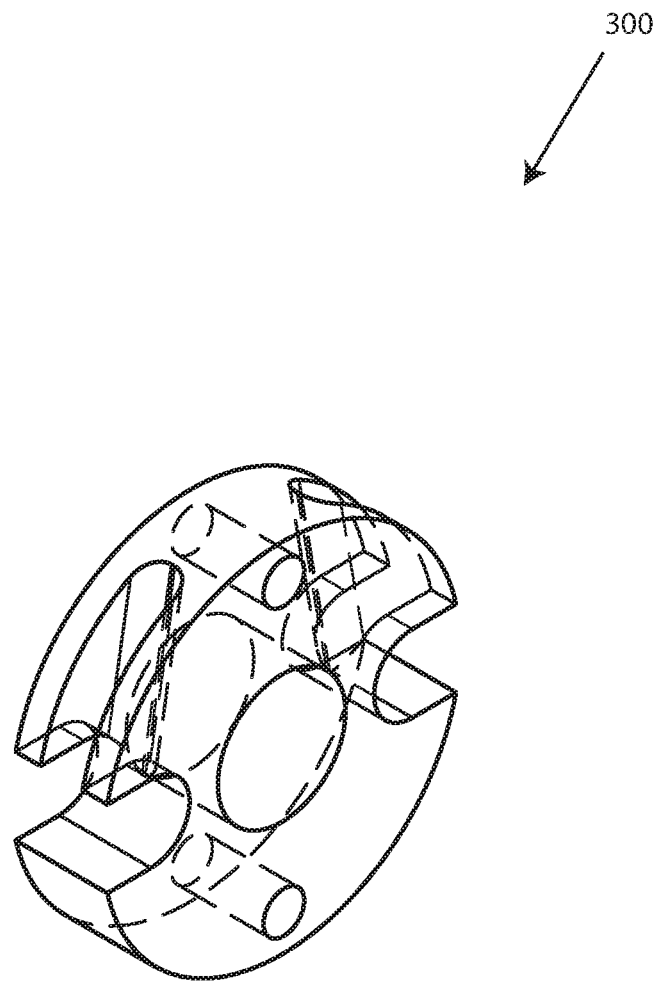
FIG. 5A of the drawings is an isometric view of the puck of the multi-axis alignment tool manufactured in accordance with the present invention.
Figure 5B:
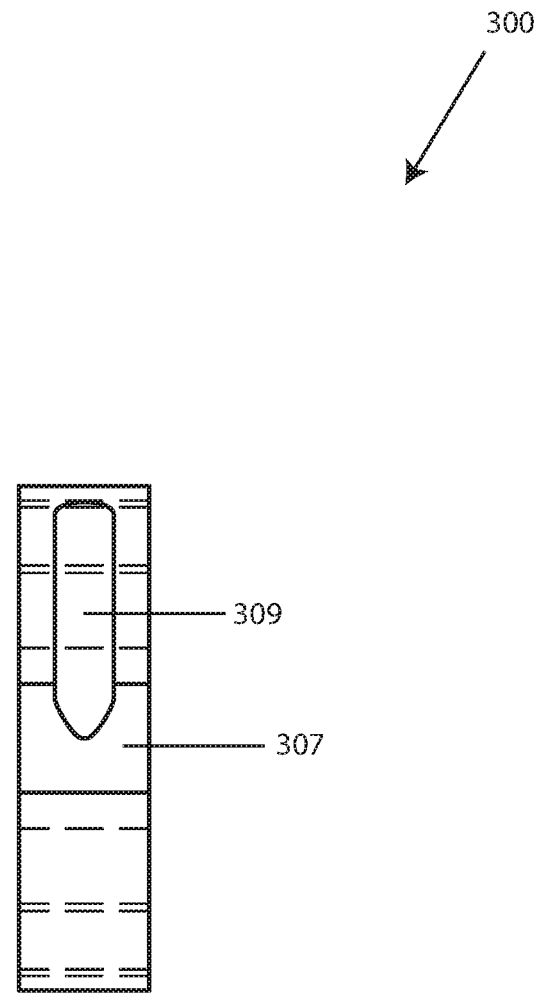
FIG. 5B of the drawings is a side view of the puck of the multi-axis alignment tool manufactured in accordance with the present invention.
Figure 5C:
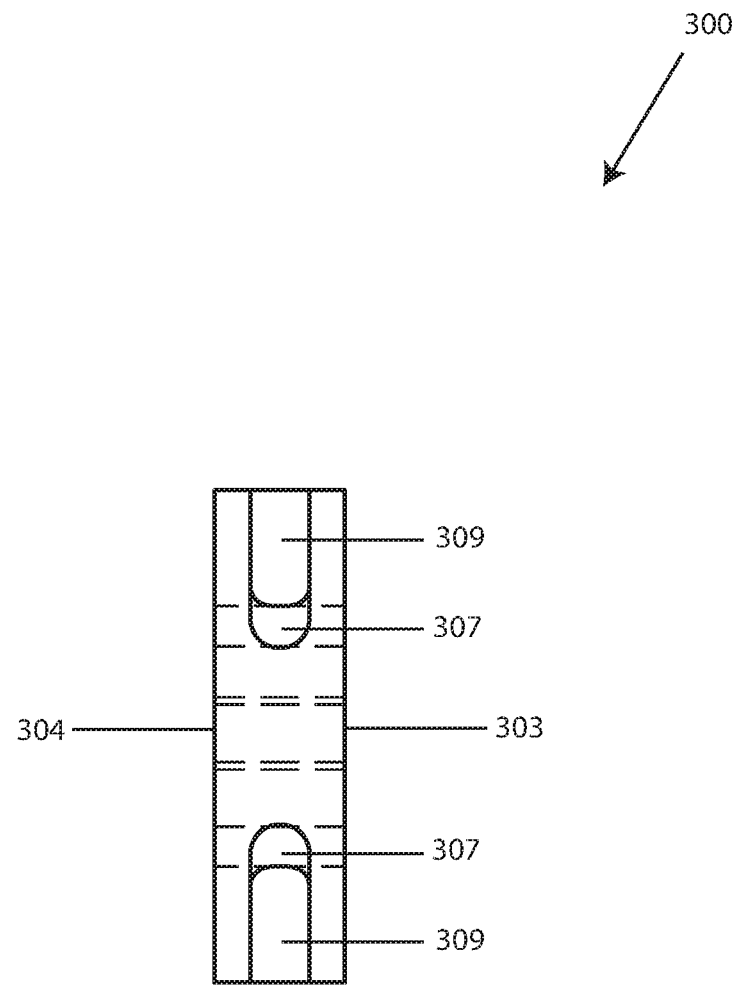
FIG. 5C of the drawings is a top plan view of the puck of the multi-axis alignment tool manufactured in accordance with the present invention.
Figure 5D:
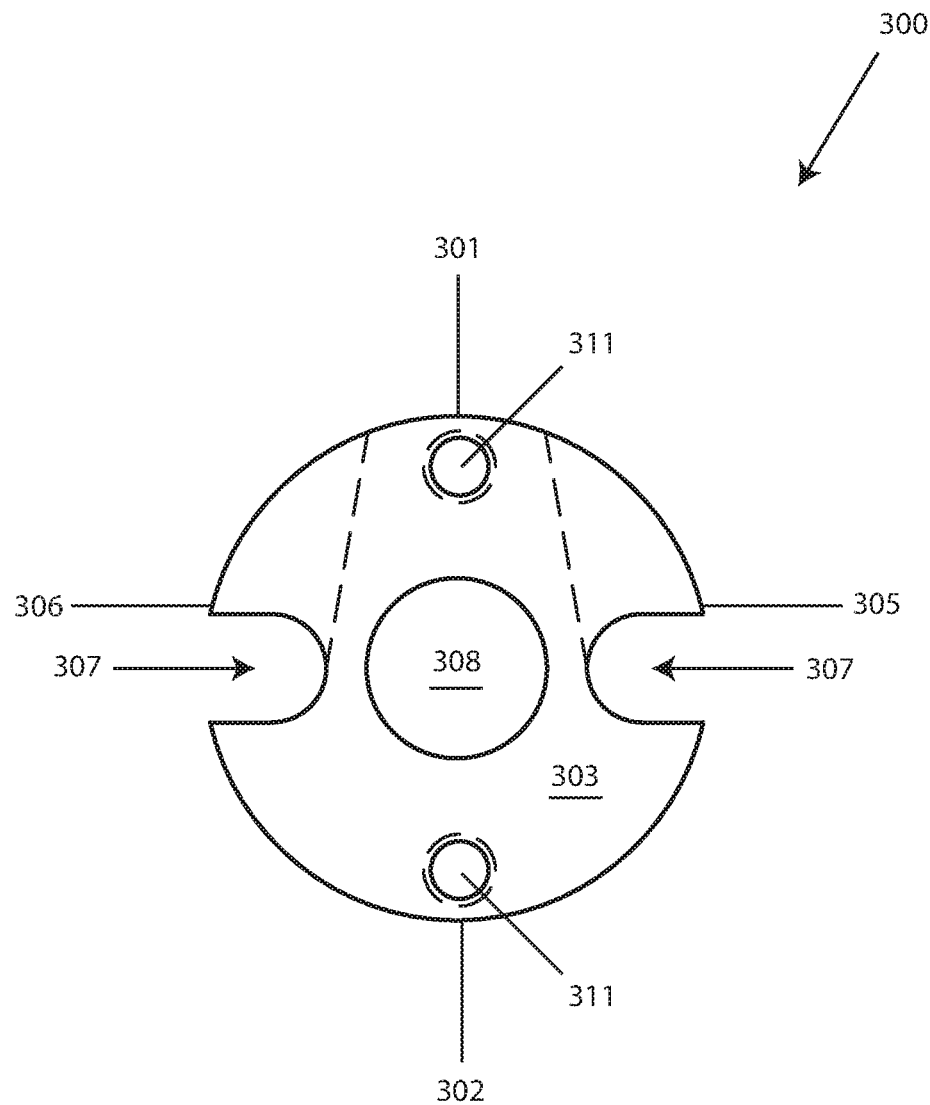
FIG. 5D of the drawings is a front end view of the puck of the multi-axis alignment tool manufactured in accordance with the present invention.

While this invention is susceptible of embodiment in many different forms, there is disclosed and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters. It will be further understood that FIGS. 1A-16 are merely schematic representations of multi-axis alignment tool 10. As such, some of the components have been distorted from their actual scale for pictorial clarity—including the deletion of aperture/port threads and conventional fasteners.

In accordance with the present invention, the multi-axis alignment tool enables a user to rapidly, accurately, and/or securely clamp, align, and/or position work part(s), in up to three axes, so that other operations can be performed on the part(s) in a very efficient manner.

Referring now to the drawings and, more particularly, to FIGS. 1A-1D in non-exploded view and FIGS. 2A-2D in exploded view, multi-axis alignment tool 10 is shown, which generally comprises main body 100, primary base 200, puck 300, puck adjusters 400, puck retainer 500, secondary base 600, first pivot pin 700, pivot block 800, clamp head 900, clamp fingers 1000, adjustment pin 1100, lock-down spacer 1200, and second pivot pin 1300.

As is best shown in FIGS. 3A-3D, main body 100 of multi-axis alignment tool 10 includes top surface 101, bottom surface 102, front surface 103, rear surface 104, left side 105, right side 106, puck retaining aperture 107, lock-down spacer aperture 108, second pivot pin aperture 109, adjustment pin aperture 110, accessory apertures/ports 111, and elongated front lip 112. As will be discussed in greater detail herein below, during normal use, primary base 200 is positioned below and releasably secured to main body 100, and puck 300 is positioned within puck retaining aperture 107 and rotatably secured to main body 100. Moreover, lock-down spacer 1200 is positioned within lock-down spacer aperture 108 on top surface 101 of main body 100. Furthermore, adjustment pin 1100 is positioned at least partially within adjustment pin aperture 110 on bottom surface 102 of main body 100.

Referring now to FIGS. 4A-4D, primary base 200 of multi-axis alignment tool 10 includes top surface 201, bottom surface 202, front surface 203, rear surface 204, left side 205, right side 206, first mounting aperture 207, second mounting aperture 208, second pivot pin aperture 209, adjustment pin aperture 210, accessory apertures/ports 211, and side slots 212. Second pivot pin 1300 is received within second pivot pin aperture 209, and adjustment pin 1100 is received within adjustment pin aperture 210.

As is best shown in FIGS. 5A-5D, puck 300 of multi-axis alignment tool 10 includes top surface 301, bottom surface 302, front surface 303, rear surface 304, left side 305, right side 306, puck adjuster slots 307, puck retainer aperture 308, grooves 309, and accessory apertures/ports 311. Puck 300 is positioned within main body 100 during normal use.

As is shown in FIGS. 6A-6D, puck adjusters 400 of multi-axis alignment tool 10 include top surface 401, bottom surface 402, front surface 403, rear surface 404, left side 405, right side 406, and accessory apertures/ports 411. First and second puck adjusters 400 are positioned within independent open slots 307 of puck 300.

Figure 7A:
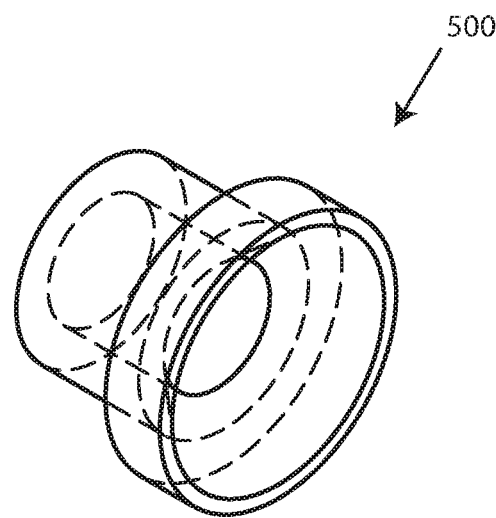
FIG. 7A of the drawings is an isometric view of the puck retainer of the multi-axis alignment tool manufactured in accordance with the present invention.
Figure 7B:
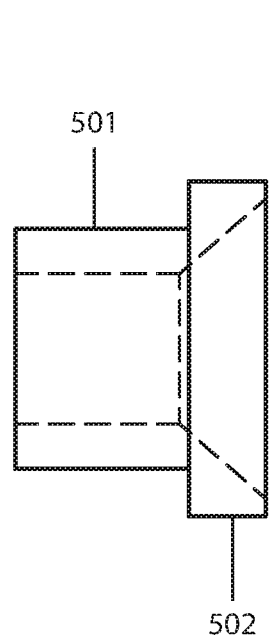
FIG. 7B of the drawings is a side view of the puck retainer of the multi-axis alignment tool manufactured in accordance with the present invention.
Figure 7C:
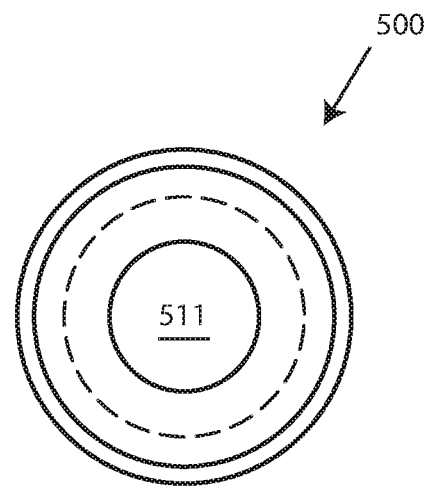
FIG. 7C of the drawings is a front end view of the puck retainer of the multi-axis alignment tool manufactured in accordance with the present invention.
Figure 8A:
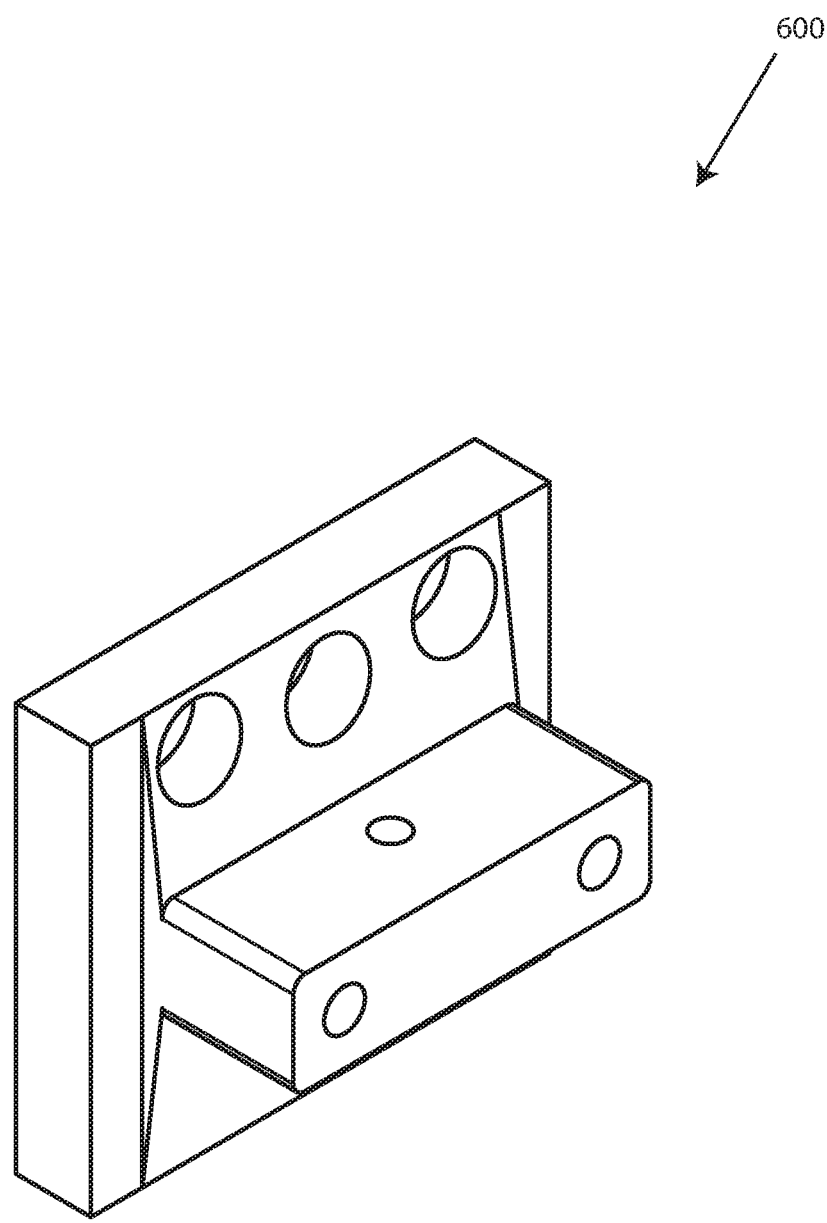
FIG. 8A of the drawings is an isometric view of the secondary base of the multi-axis alignment tool manufactured in accordance with the present invention.
Figure 8B:
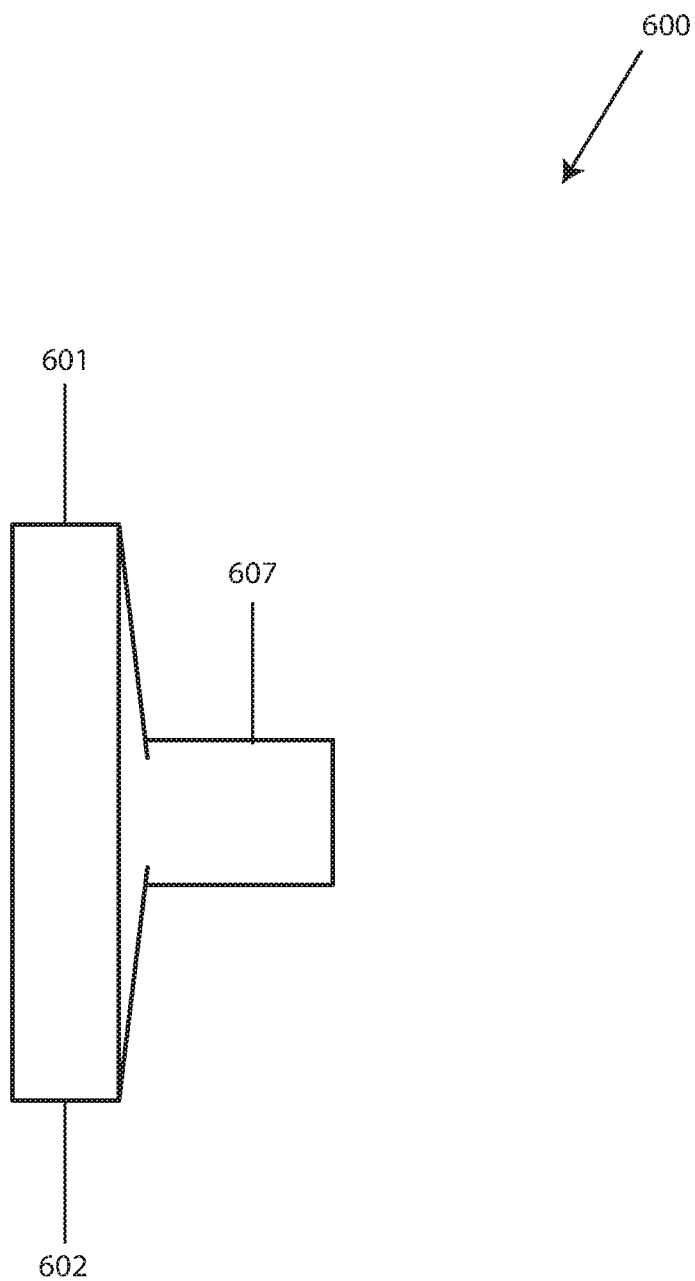
FIG. 8B of the drawings is a side view of the secondary base of the multi-axis alignment tool manufactured in accordance with the present invention.
Figure 8C:
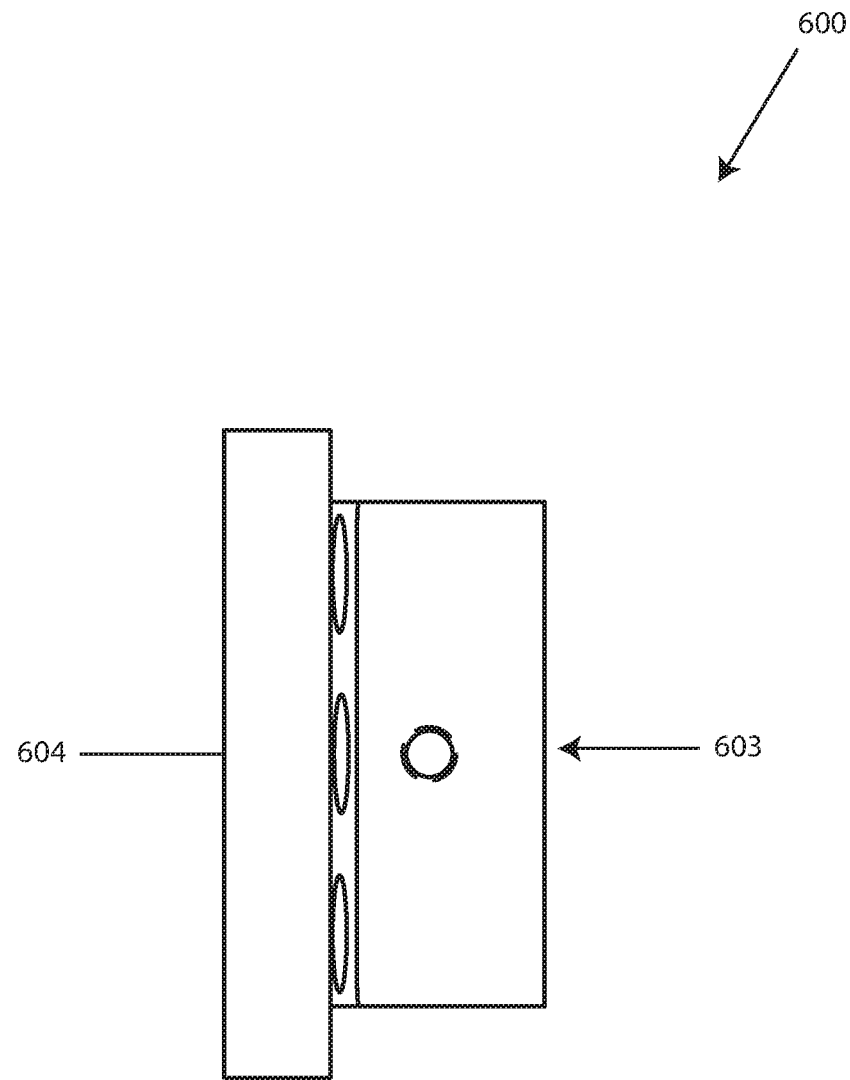
FIG. 8C of the drawings is a top plan view of the secondary base of the multi-axis alignment tool manufactured in accordance with the present invention.
Figure 8D:
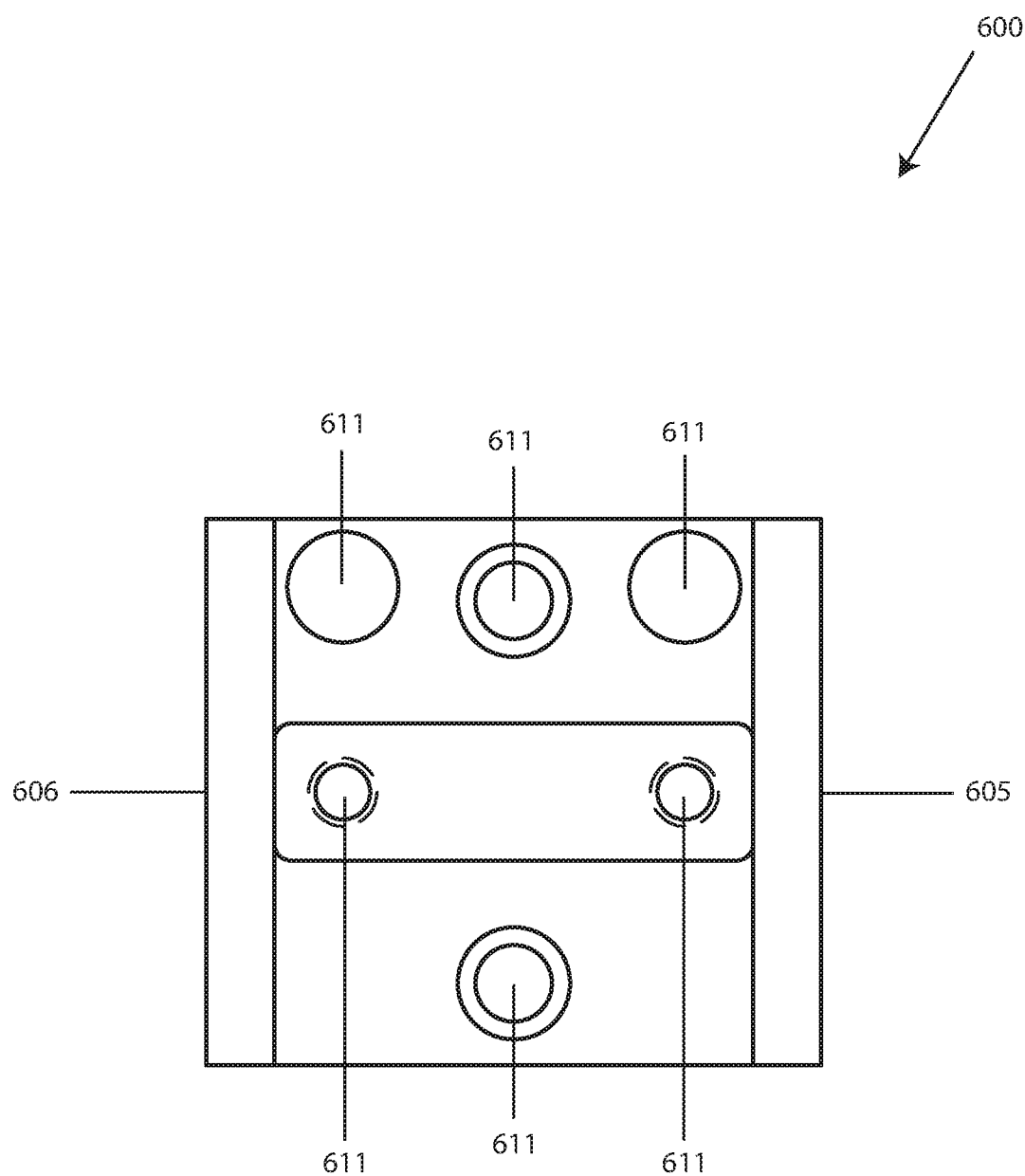
FIG. 8D of the drawings is a front end view of the secondary base of the multi-axis alignment tool manufactured in accordance with the present invention.
Figure 9A:
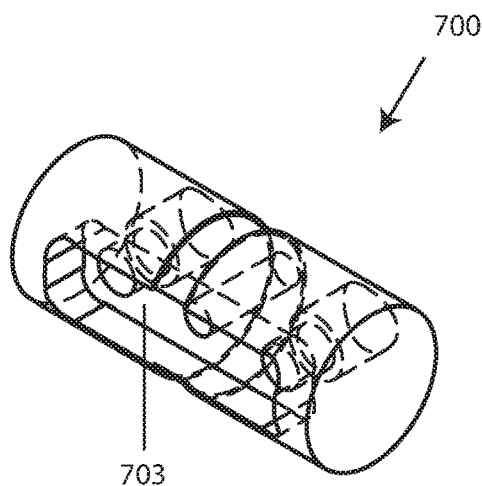
FIG. 9A of the drawings is a front isometric view of the first pivot pin of the multi-axis alignment tool manufactured in accordance with the present invention.
Figure 9C:
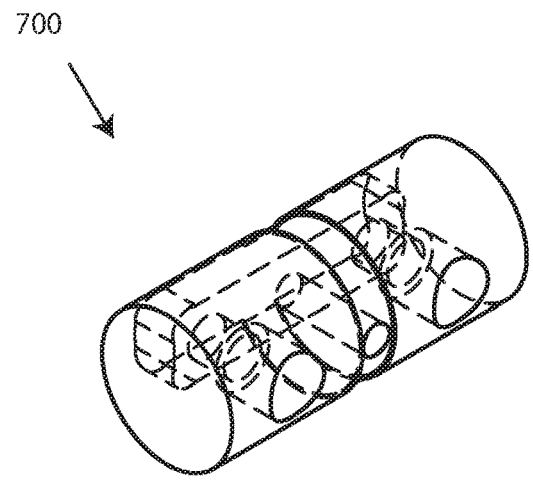
FIG. 9C of the drawings is a rear isometric view of the first pivot pin of the multi-axis alignment tool manufactured in accordance with the present invention.
Figure 9B:
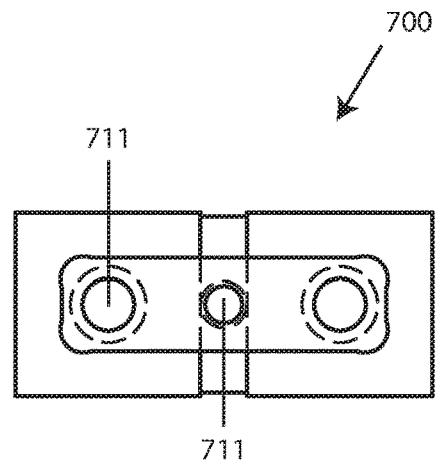
FIG. 9B of the drawings is a front side view of the first pivot pin of the multi-axis alignment tool manufactured in accordance with the present invention.
Figure 9D:
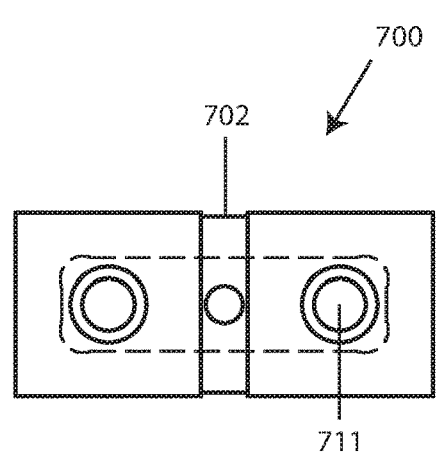
FIG. 9D of the drawings is a rear side view of the first pivot pin of the multi-axis alignment tool manufactured in accordance with the present invention.
Figure 9E:
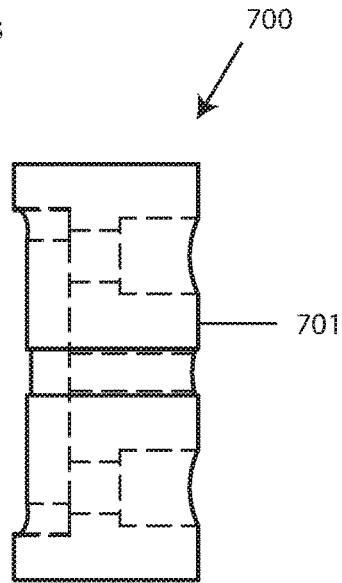
FIG. 9E of the drawings is a top plan view of the first pivot pin of the multi-axis alignment tool manufactured in accordance with the present invention.
Figure 9F:
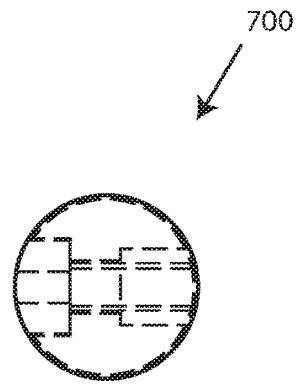
FIG. 9F of the drawings is a front end view of the first pivot pin of the multi-axis alignment tool manufactured in accordance with the present invention.
Figure 10A:
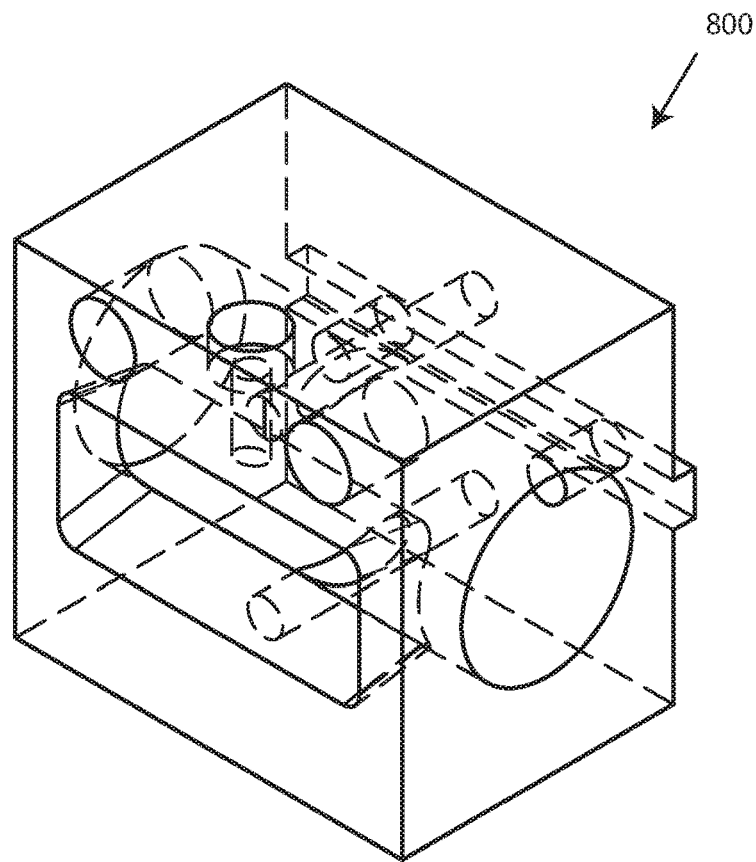
FIG. 10A of the drawings is a front isometric view of the pivot block of the multi-axis alignment tool manufactured in accordance with the present invention.
Figure 10B:
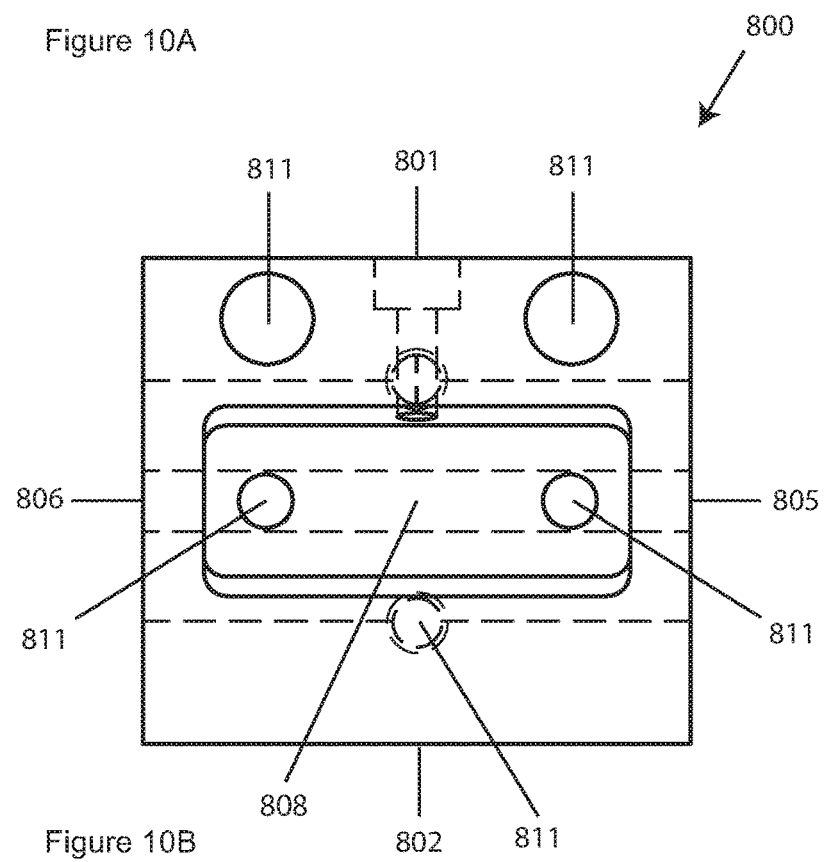
FIG. 10B of the drawings is a front view of the pivot block of the multi-axis alignment tool manufactured in accordance with the present invention.
Figure 10C:
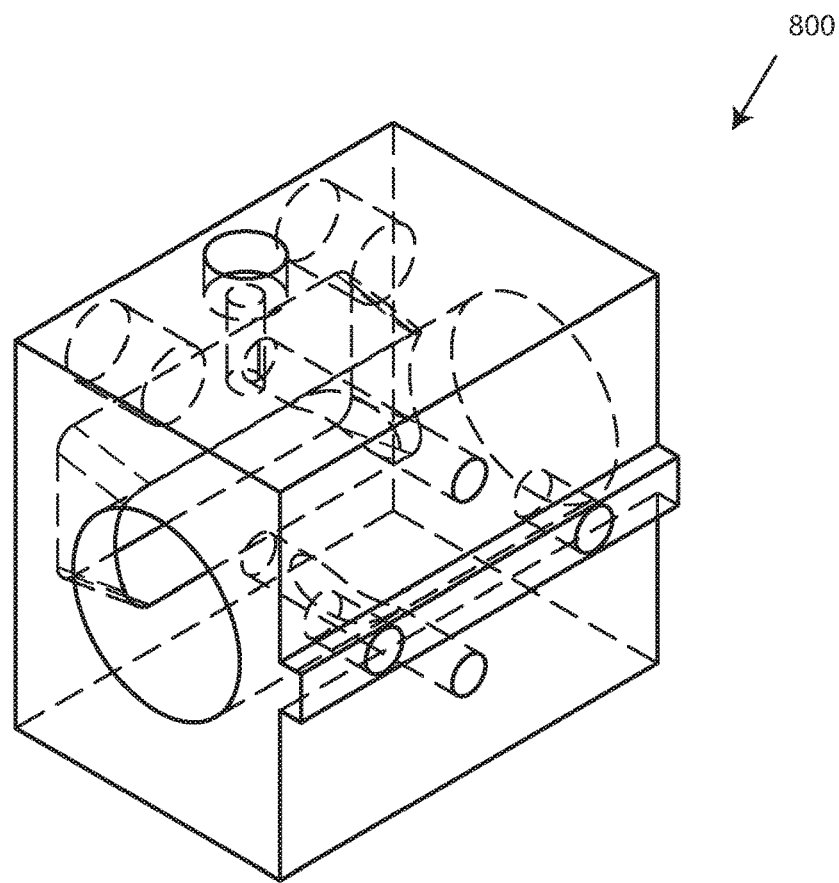
FIG. 10C of the drawings is a rear isometric view of the pivot block of the multi-axis alignment tool manufactured in accordance with the present invention.
Figure 10D:
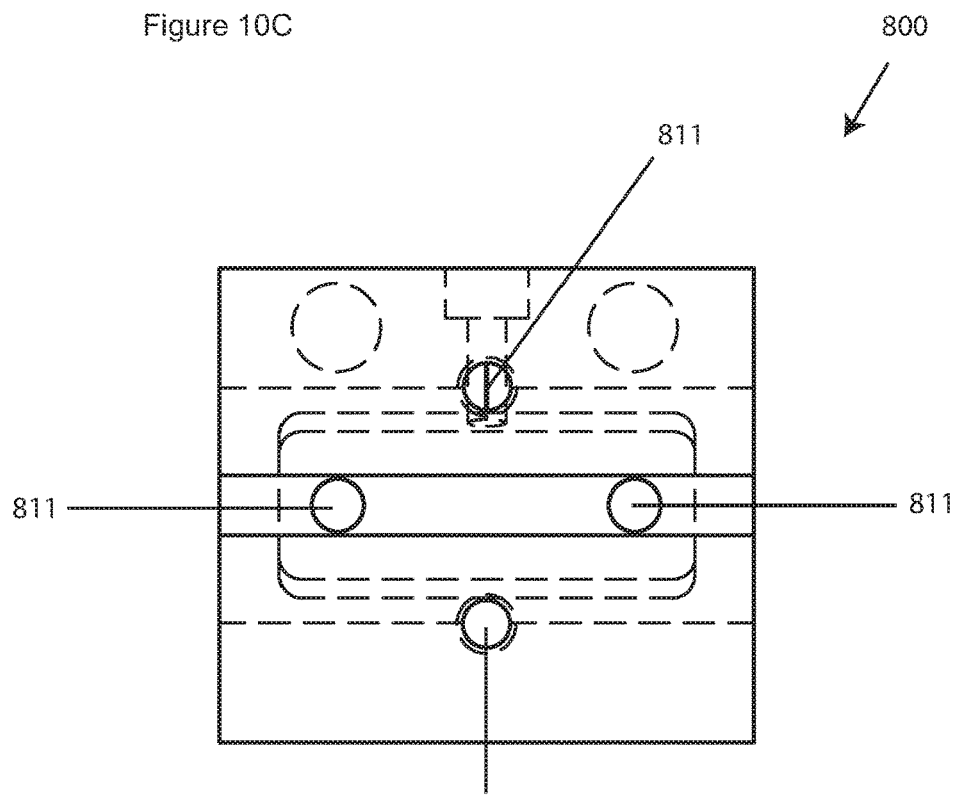
FIG. 10D of the drawings is a rear view of the pivot block of the multi-axis alignment tool manufactured in accordance with the present invention.
Figure 10E:
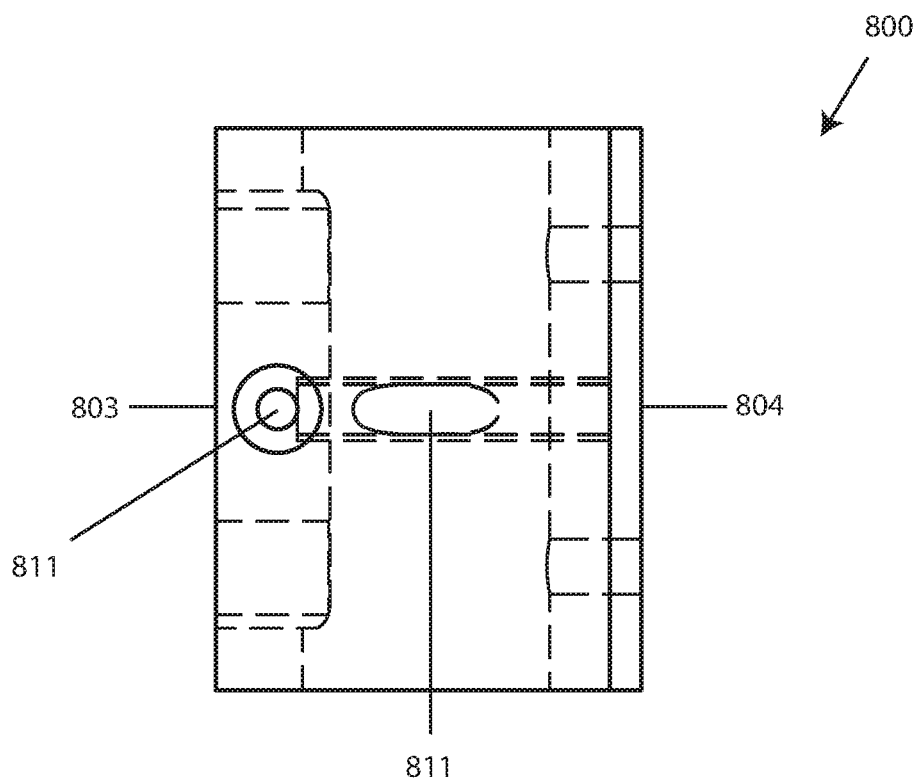
FIG. 10E of the drawings is a top plan view of the pivot block of the multi-axis alignment tool manufactured in accordance with the present invention.
Figure 10F:
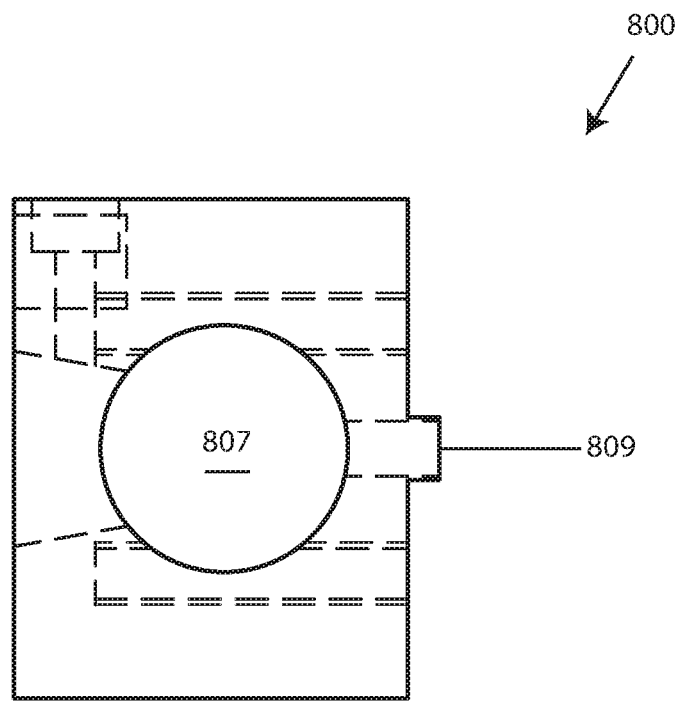
FIG. 10F of the drawings is a side view of the pivot block of the multi-axis alignment tool manufactured in accordance with the present invention.
Figure 11A:
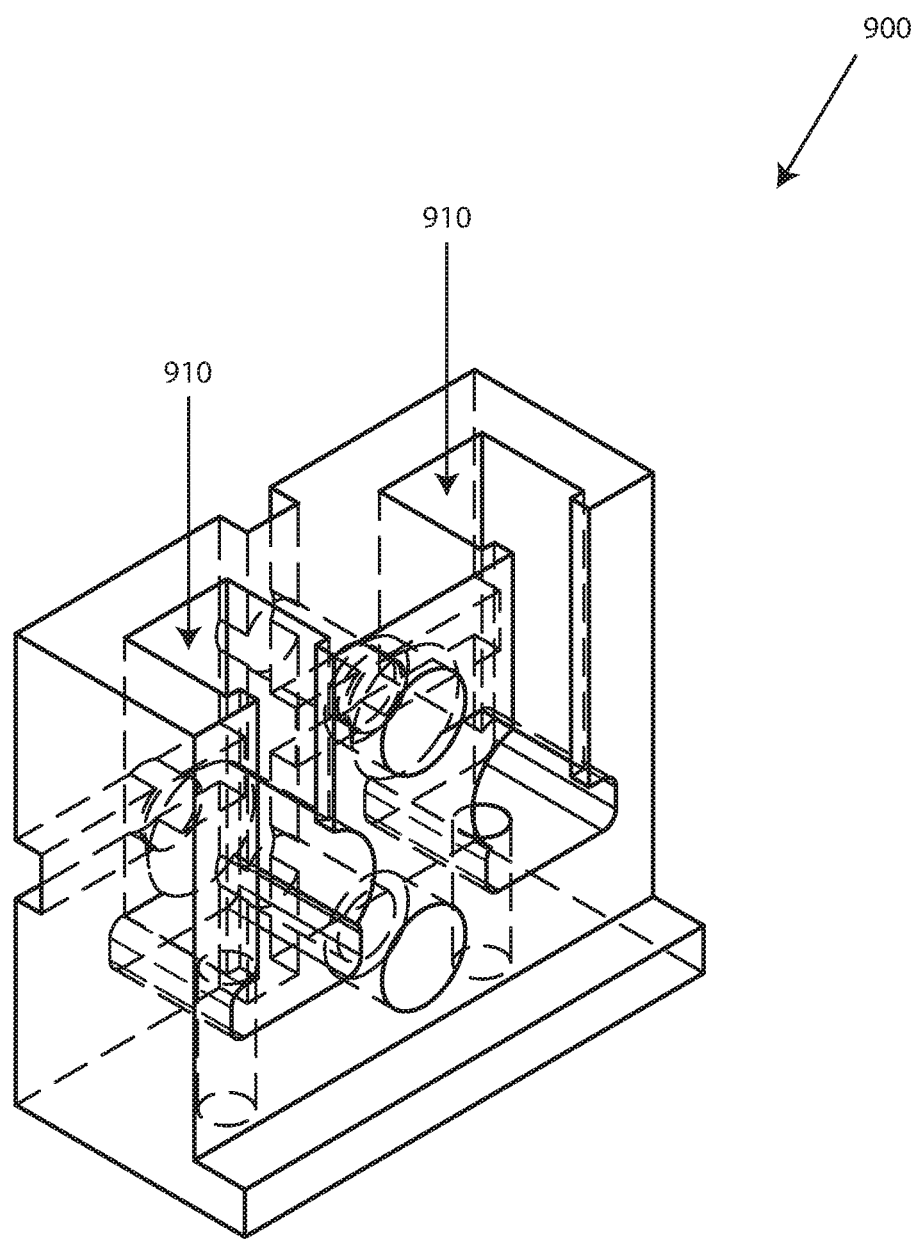
FIG. 11A of the drawings is an isometric view of the clamp head of the multi-axis alignment tool manufactured in accordance with the present invention.
Figure 11B:
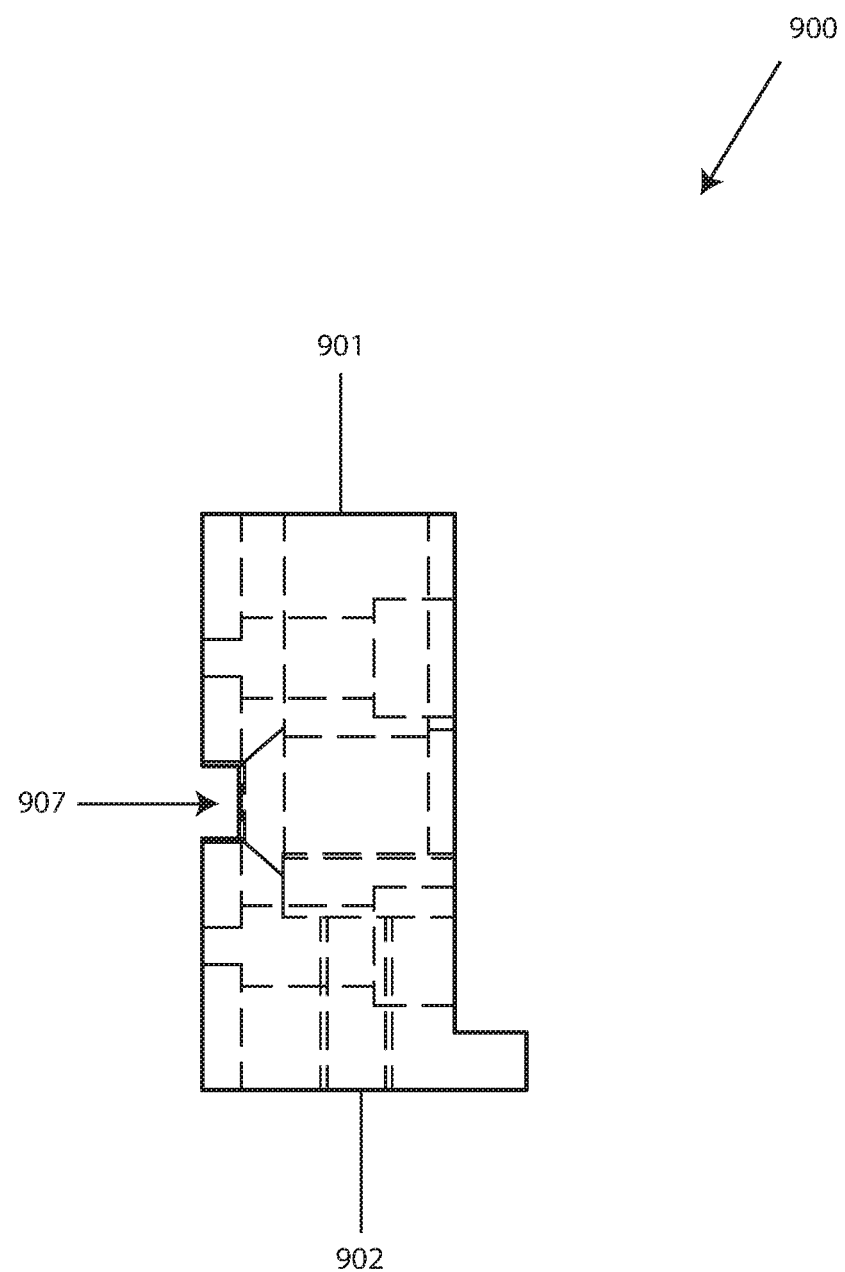
FIG. 11B of the drawings is a side view of the clamp head of the multi-axis alignment tool manufactured in accordance with the present invention.
Figure 11C:
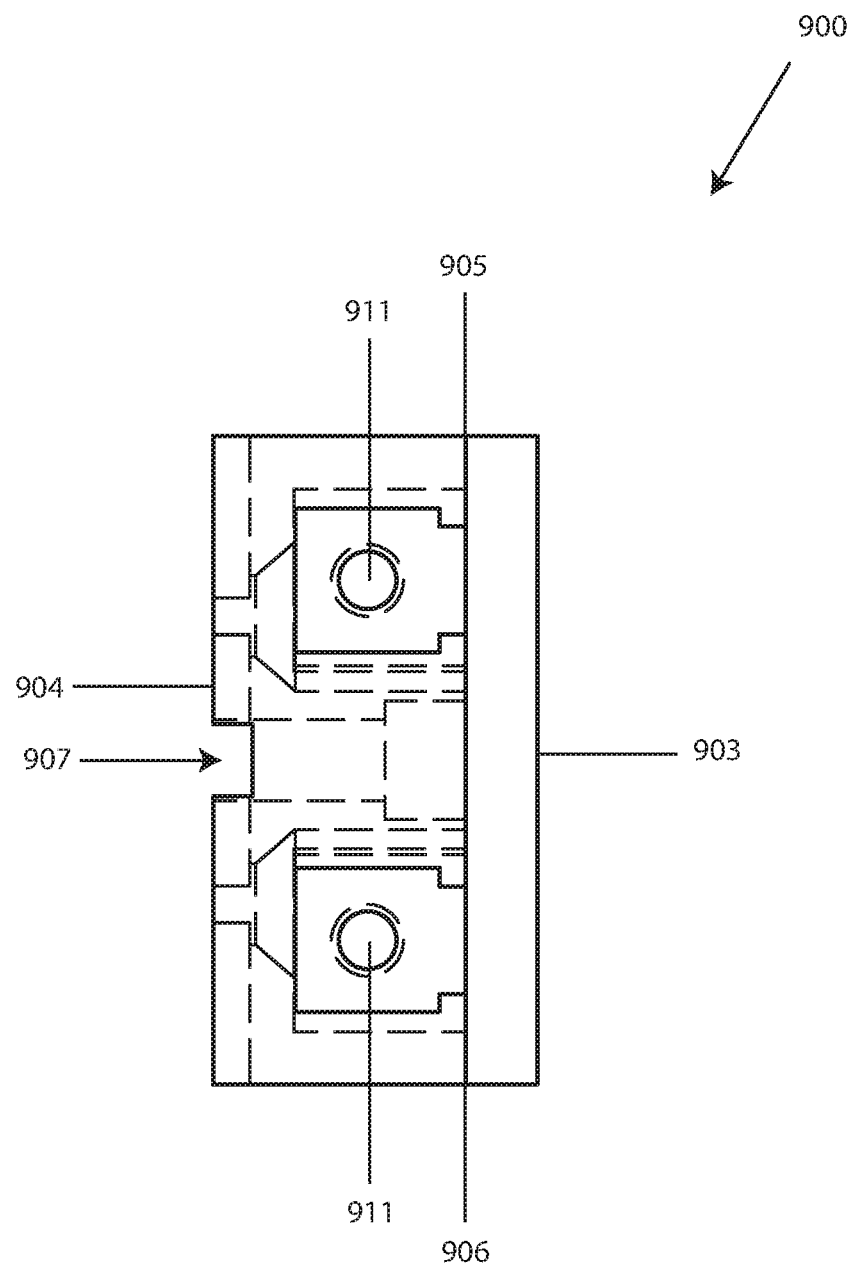
FIG. 11C of the drawings is a top plan view of the clamp head of the multi-axis alignment tool manufactured in accordance with the present invention.
Figure 11D:
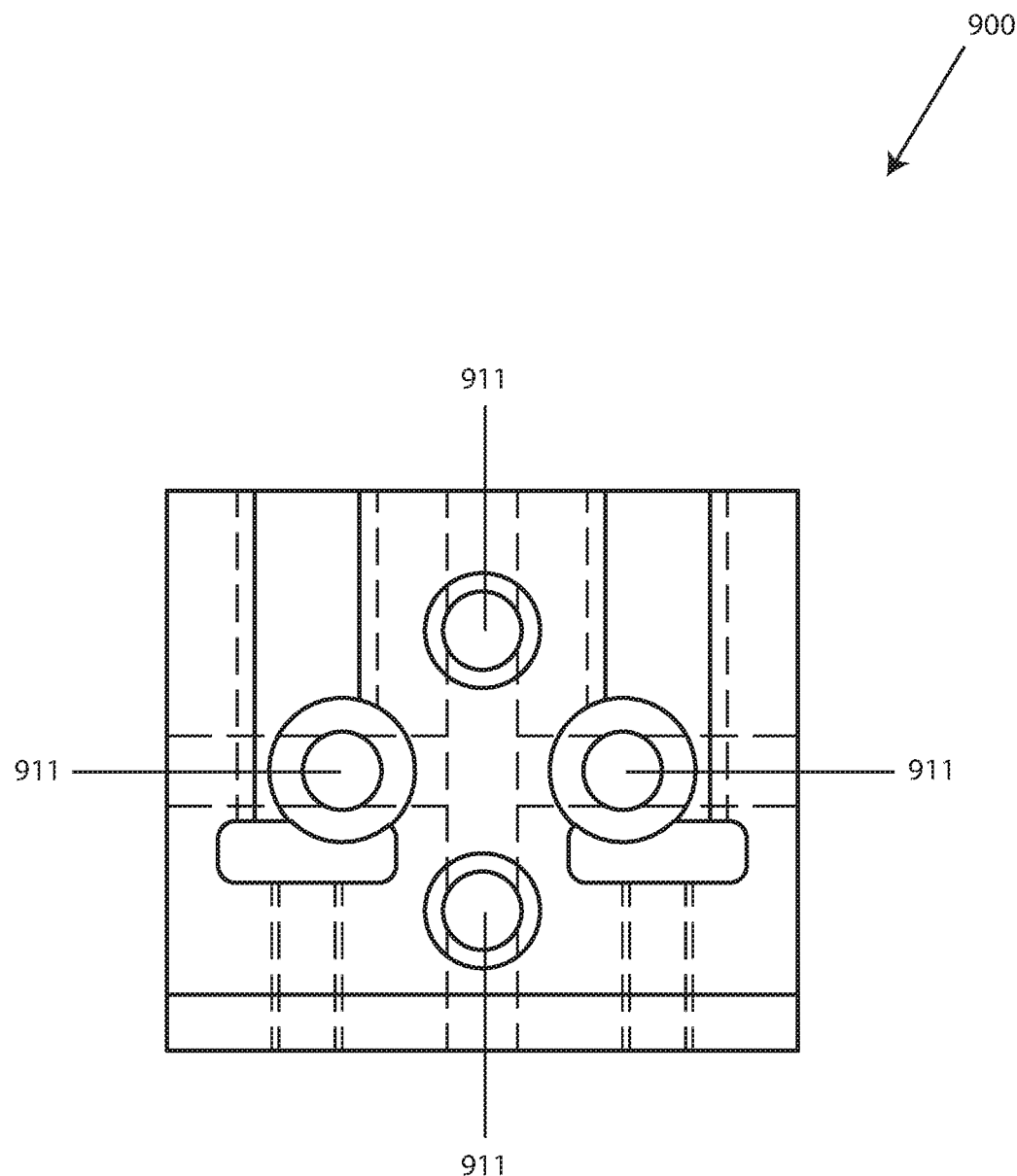
FIG. 11D of the drawings is a front end view of the clamp head of the multi-axis alignment tool manufactured in accordance with the present invention.
Figure 12A:
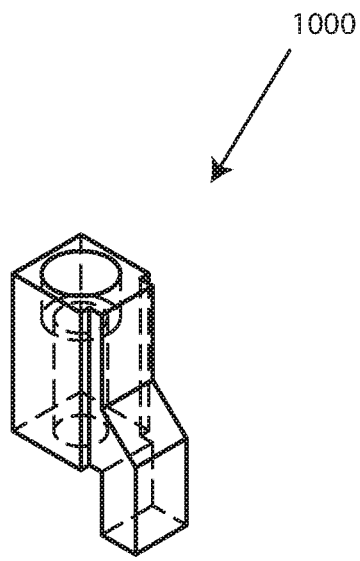
FIG. 12A of the drawings is an isometric view of the clamp finger of the multi-axis alignment tool manufactured in accordance with the present invention.
Figure 12B:
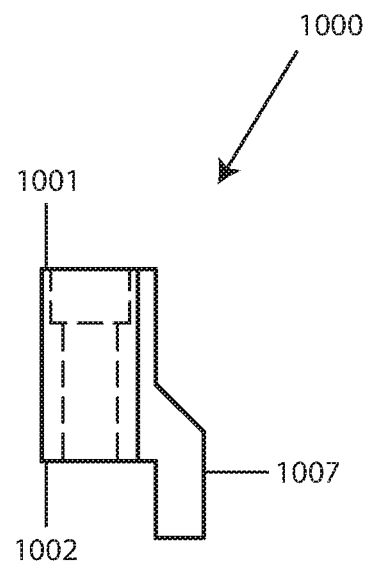
FIG. 12B of the drawings is a side view of the clamp finger of the multi-axis alignment tool manufactured in accordance with the present invention.
Figure 12C:
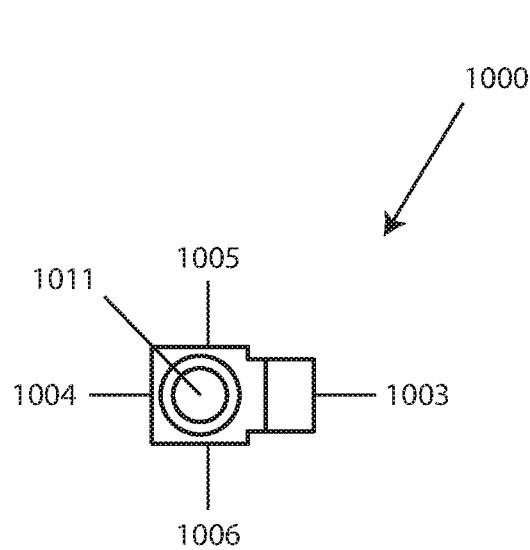
FIG. 12C of the drawings is a top plan view of the clamp finger of the multi-axis alignment tool manufactured in accordance with the present invention.
Figure 12D:
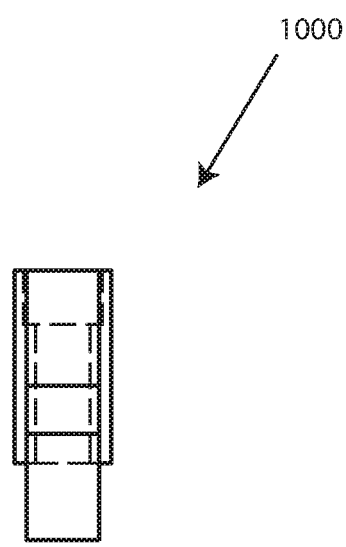
FIG. 12D of the drawings is a front end view of the clamp finger of the multi-axis alignment tool manufactured in accordance with the present invention.

Referring now to FIGS. 7A-7C, puck retainer 500 of multi-axis alignment tool 10 includes cylindrical body 501, head 502, and accessory aperture/port 511. Puck retainer 500 is releasably retained within a central aperture of puck 300 and releasably secured to main body 100.

Referring now to FIGS. 8A-8D, secondary base 600 of multi-axis alignment tool 10 includes top surface 601, bottom surface 602, front surface 603, rear surface 604, left side 605, right side 606, first pivot pin tab 607, and accessory apertures/ports 611. Secondary base 600 encloses puck 300, and is positioned adjacent to main body 100 and primary base 200.

As is shown in FIGS. 9A-9F, first pivot pin 700 of multi-axis alignment tool 10 includes cylindrical body 701, radial groove 702, first pivot pin tab aperture 703, and accessory aperture/port 711. During normal use first pivot pin 700 is positioned within pivot block 800.

Referring now to FIGS. 10A-10F, pivot block 800 of multi-axis alignment tool 10 includes top surface 801, bottom surface 802, front surface 803, rear surface 804, left side 805, right side 806, first pivot pin aperture 807, first pivot pin tab aperture 808, clamp head mounting flange 809, and accessory apertures/ports 811. A portion of secondary base 600 is positioned within both pivot block 800 and first pivot pin 700.

Referring now to FIGS. 11A-11D, clamp head 900 of multi-axis alignment tool 10 includes top surface 901, bottom surface 902, front surface 903, rear surface 904, left side 905, right side 906, female slot 907 for receiving mounting flange 809 of pivot block 800, clamp finger receiving slots 910, and accessory apertures/ports 911. Clamp head 900 is positioned adjacent to and releasably secured to pivot block 800.

Referring now to FIGS. 12A-12D, clamp fingers 1000 of multi-axis alignment tool 10 include top surface 1001, bottom surface 1002, front surface 1003, rear surface 1004, left side 1005, right side 1006, finger member 1007, and accessory apertures/ports 1011. Clamp fingers 1000 are independently, releasably received within clamp finger receiving slots 910 of clamp head 900.

Figure 13A:
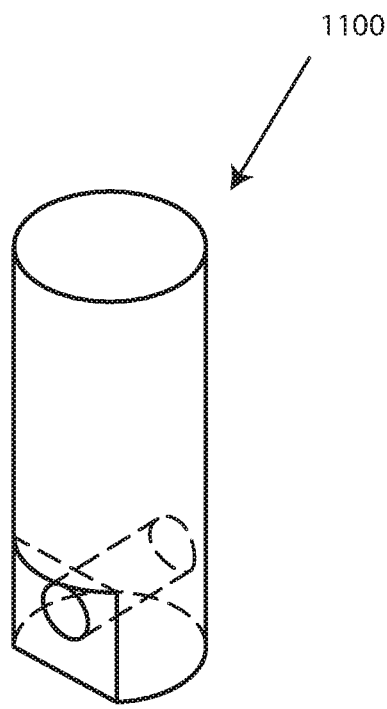
FIG. 13A of the drawings is an isometric view of the adjustment pin of the multi-axis alignment tool manufactured in accordance with the present invention.
Figure 13B:
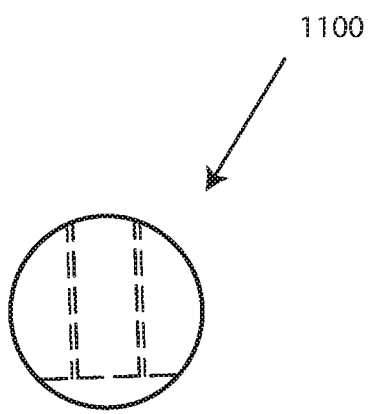
FIG. 13B of the drawings is a top plan view of the adjustment pin of the multi-axis alignment tool manufactured in accordance with the present invention.
Figure 13C:
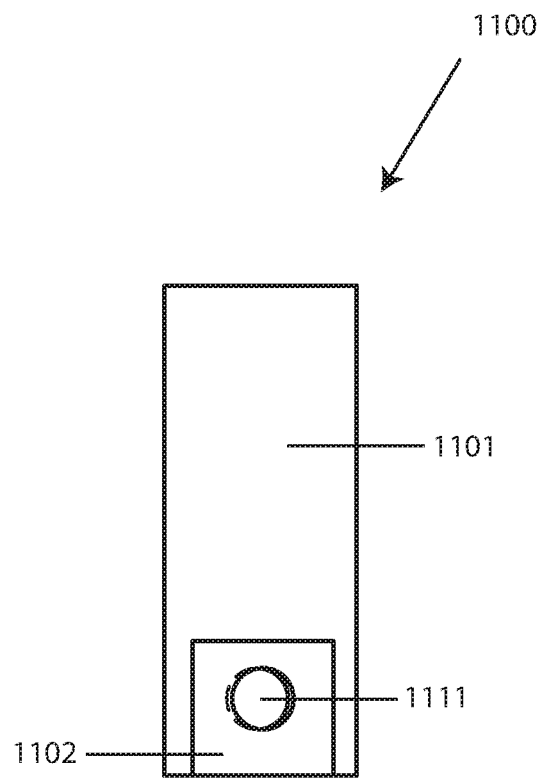
FIG. 13C of the drawings is a front end view of the adjustment pin of the multi-axis alignment tool manufactured in accordance with the present invention.
Figure 14A:
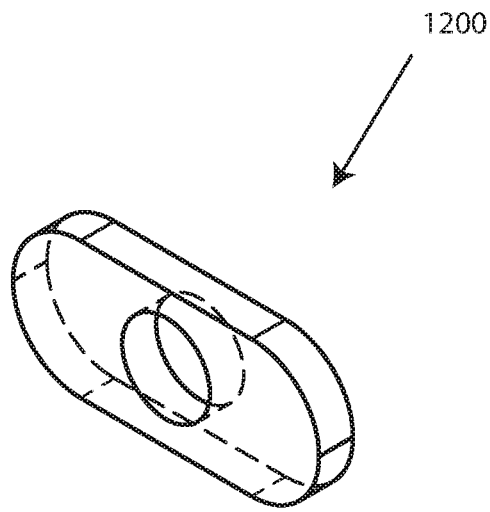
FIG. 14A of the drawings is an isometric view of the lock-down spacer of the multi-axis alignment tool manufactured in accordance with the present invention.
Figure 14B:
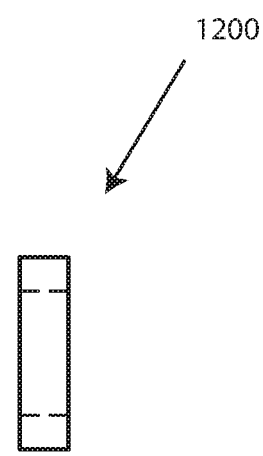
FIG. 14B of the drawings is a side view of the lock-down spacer of the multi-axis alignment tool manufactured in accordance with the present invention.
Figure 14C:
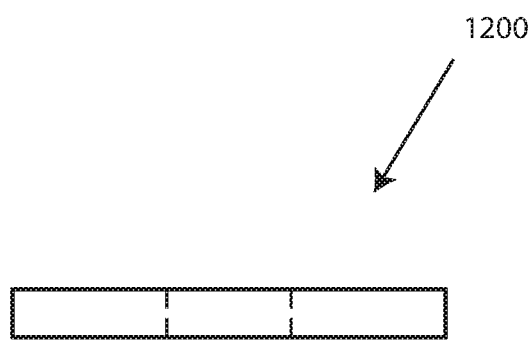
FIG. 14C of the drawings is a top plan view of the lock-down spacer of the multi-axis alignment tool manufactured in accordance with the present invention.
Figure 14D:
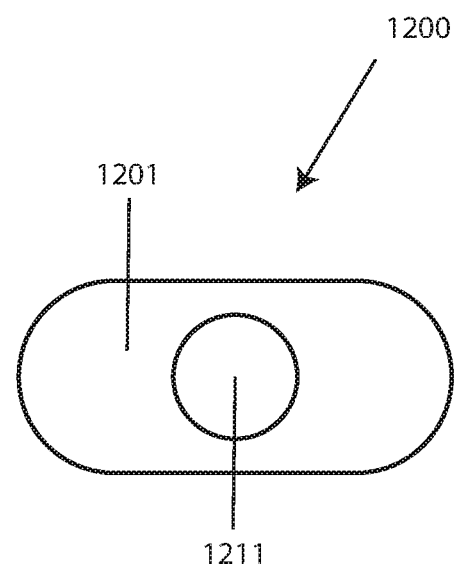
FIG. 14D of the drawings is a front end view of the lock-down spacer of the multi-axis alignment tool manufactured in accordance with the present invention.

As is shown in FIGS. 13A-13C, adjustment pin 1100 of multi-axis alignment tool 10 includes cylindrical body 1101, planar surface 1102, and accessory aperture/port 1111.

As is shown in FIGS. 14A-14D, lock-down spacer 1200 of multi-axis alignment tool 10 includes elliptical body 1201 and accessory aperture/port 1211.

As is shown in FIGS. 15A-15C, second pivot pin 1300 of multi-axis alignment tool 10 includes cylindrical body 1301, head 1302, and accessory aperture/port 1311.

Figure 16:
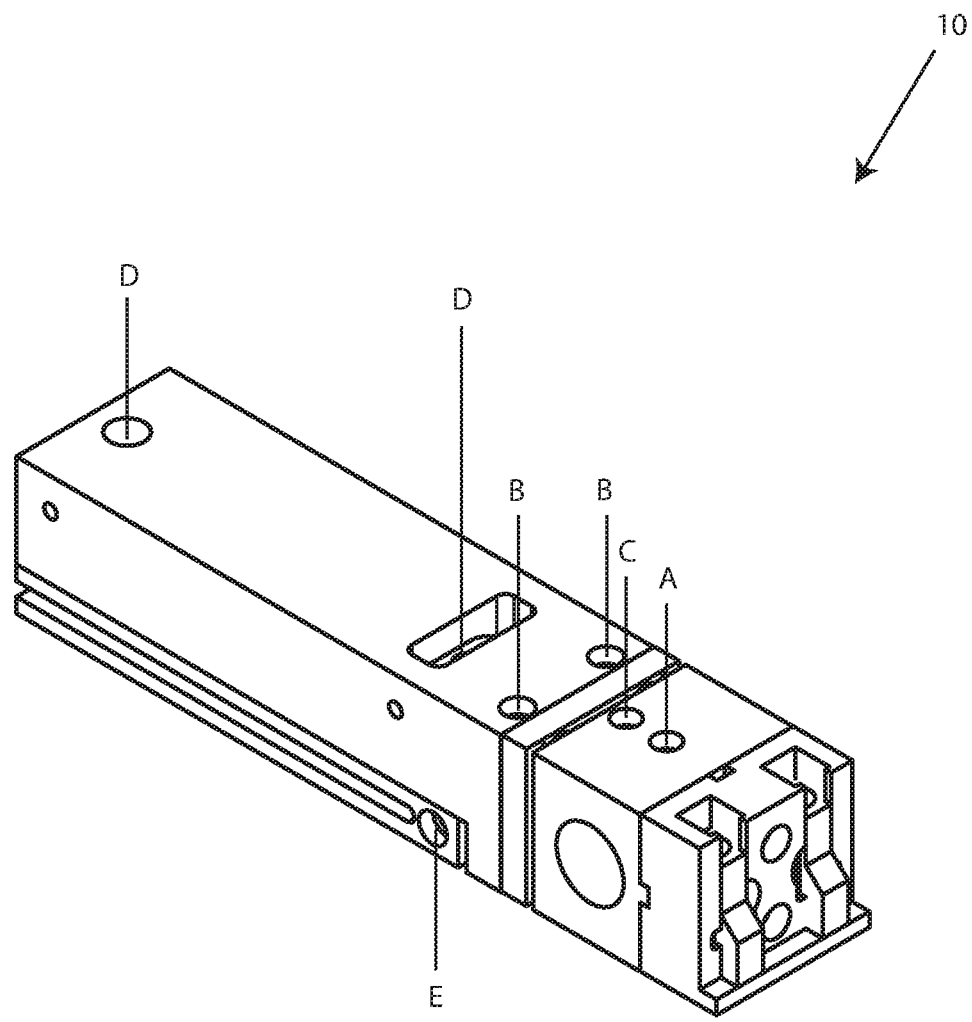
FIG. 16 of the drawings is an isometric view of the multi-axis alignment tool manufactured in accordance with the present invention, showing among other things, operational control locations for multi-axis alignment.

In operation and as is best shown in FIG. 16, a user starts multi-axis alignment with tool 10 by clamping a part in clamp head 900 and tightening clamp head fingers 1000. Once the part is secured, the user typically uses an indicator to sweep/validate alignment utilizing the following steps. First, the $3^{rd}$ axis is aligned by adjusting a standard 10-32 socket head cap screw (SHCS) which located on pivot block 800 (Location C). Once the alignment is confirmed or validated, then the users secures the SHCS on the pivot block (Location A). Next, the $2^{nd}$ axis is aligned by adjusting two 10-32 SHCS's at the front main body 100 (Location B). The two 10-32 SHCS's act as a push-pull system. A user simply loosens the screw on the same side of the part that indicates high and tightens the screw that reads low. This is done until the part is aligned in the $2^{nd}$ axis. Once the alignment is confirmed or validated, then the axis is secured by making sure the two SHCS's (Location B) are tight. Next, the $1^{st}$ axis is aligned by adjusting the SHCS (Location E) on the first pivot pin (Location rear D) and the lockdown SHCS (Location front D). The user will then snug both screws down slightly, but not so tight that the first axis will not move. The user then adjusts the first axis by turning the 10-32 SHCS located on the side of the primary base (Location E). Once the alignment is confirmed or validated, then the user secures the SHCS's (Locations front and rear D) on the main body. Lastly, the user cuts or modifies the aligned part.

The foregoing description merely explains and illustrates the invention and the invention is not limited thereto except insofar as the appended claims are so limited, as those skilled in the art who have the disclosure before them will be able to make modifications without departing from the scope of the invention.

What is claimed and desired to be secured by Letters Patent of the United States is:

1. A multi-axis alignment tool, consisting of:
   a main body; a primary base; a puck; a first puck adjuster; a second puck adjuster; a puck retainer; a secondary base; a first pivot pin; a pivot block; a clamp head; an adjustment pin; a lock-down spacer; and a second pivot pin;
   wherein the main body comprises a top surface, a bottom surface, a front surface, a rear surface, a left side, a right side, a puck retaining aperture, wherein the puck retaining aperture is positioned within the front surface of the main body, a lock-down spacer aperture, wherein the lock-down spacer aperture is positioned within the top surface of the main body, a second pivot pin aperture, wherein the second pivot pin aperture is positioned within the bottom surface of the main body, and an elongated front lip, wherein the elongated front lip extends below the bottom surface of the main body; and a containment region for containing at least a portion of the primary base;

wherein the primary base is positioned below and releasably secured to the main body;

wherein the puck is positioned within the main body and rotatably secured to the main body;

wherein the lock-down spacer is positioned within an aperture on a top surface of the main body;

wherein the adjustment pin is positioned at least partially within an aperture on a bottom surface of the main body;

wherein the first and second puck adjusters are positioned within independent open slots of the puck;

wherein the puck retainer is positioned within a central aperture of the puck;

wherein the secondary base encloses the puck and is positioned adjacent to the primary base;

wherein the first pivot pin is positioned within the pivot block;

wherein a portion of the secondary base is positioned within the pivot block and the first pivot pin; and wherein the clamp head is positioned adjacent to and releasably secured to the pivot block.

\* \* \* \* \*